United States Patent
Khan et al.

(10) Patent No.: US 11,591,457 B1
(45) Date of Patent: *Feb. 28, 2023

(54) COMPOSITE MATERIAL INCLUDING THREE-DIMENSIONAL (3D) GRAPHENE AND MALEATED COPOLYMERS

(71) Applicant: LytEn, Inc., San Jose, CA (US)

(72) Inventors: Salik Khan, Santa Clara, CA (US); Bryce H. Anzelmo, Mountain View, CA (US); John Baldwin, San Jose, CA (US); Minedys Macias, San Diego, CA (US); Chandra B. KC, San Jose, CA (US)

(73) Assignee: Lyten, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/708,645

(22) Filed: Mar. 30, 2022

(51) Int. Cl.
   C08L 23/12        (2006.01)
   C08K 3/04         (2006.01)
   (Continued)

(52) U.S. Cl.
   CPC ........... C08L 23/06 (2013.01); C08K 3/042 (2017.05); C08L 23/0815 (2013.01);
   (Continued)

(58) Field of Classification Search
   CPC ...... C08F 23/12; C08F 23/06; C08F 23/0815; C08F 2205/02; C08K 3/042; C08L 23/12;
   (Continued)

(56) References Cited

U.S. PATENT DOCUMENTS

| | | | | |
|---|---|---|---|---|
| 5,605,961 A | * | 2/1997 | Lee | C08L 75/04 |
| | | | | 525/66 |
| 6,759,474 B1 | * | 7/2004 | Keener | C08L 53/02 |
| | | | | 524/505 |

(Continued)

FOREIGN PATENT DOCUMENTS

| | | | | |
|---|---|---|---|---|
| CN | 104845361 A | | 8/2015 | |
| CN | 107141698 A | * | 9/2017 | ............ C08L 55/02 |

(Continued)

OTHER PUBLICATIONS

CN 109054151A (Dec. 21,2018) Liu, Hongyu et al.; machine translation. (Year: 2018).*

(Continued)

*Primary Examiner* — Rip A Lee
(74) *Attorney, Agent, or Firm* — Paradice & Li LLP

(57) ABSTRACT

A composite material includes a combination including a thermoplastic resin mixed with a polypropylene-graft-maleic anhydride (PPgMA), and a plurality of carbon particles mixed in the combination. The plurality of carbon particles may include a first region having a relatively low concentration of carbon particles, and a second region having a relatively high concentration of carbon particles, at least some of the plurality of carbon particles having exposed carbon surfaces with carbon atoms bonded to molecular sites on adjacent PPgMA molecules and oxidized with one or more oxygen-containing groups. In some aspects, composite material further includes between 80 wt. % and 90 wt. % of the thermoplastic resin, between 0.5 wt. % and 15 wt. % of the PPgMA, and between 0.1 wt. % to 7 wt. % of carbon particles. The composite material may also include a plurality of pores, formed in the combination, and configured to be infiltrated by the PPgMA.

24 Claims, 30 Drawing Sheets

(51) Int. Cl.
*C08L 23/06* (2006.01)
*C08L 23/08* (2006.01)

(52) U.S. Cl.
CPC ........... *C08L 23/12* (2013.01); *C08L 2203/30* (2013.01); *C08L 2207/066* (2013.01)

(58) Field of Classification Search
CPC ... C08L 23/06; C08L 23/0815; C08L 2205/02
See application file for complete search history.

(56) References Cited

U.S. PATENT DOCUMENTS

| | | | | |
|---|---|---|---|---|
| 10,472,497 | B2 * | 11/2019 | Stowell | ............... C08K 11/00 |
| 10,676,600 | B2 * | 6/2020 | Mercx | ............... C08L 23/12 |
| 2016/0251506 | A1 | 9/2016 | Kong et al. | |
| 2016/0376430 | A1 * | 12/2016 | Kusumoto | ......... C08L 23/0815 524/494 |
| 2018/0073110 | A1 | 3/2018 | Balachandran et al. | |
| 2019/0330455 | A1 | 10/2019 | Cernohous et al. | |
| 2020/0017645 | A1 | 1/2020 | Nosker et al. | |

FOREIGN PATENT DOCUMENTS

| | | | | | |
|---|---|---|---|---|---|
| CN | 107629383 | A | * | 1/2018 | ............... C08L 51/06 |
| CN | 109054151 | A | * | 12/2018 | ............... C08L 23/06 |
| CN | 110684312 | A | * | 1/2020 | ............... C08L 51/06 |
| CN | 111187474 | A | * | 5/2020 | ............... C08K 9/10 |
| CN | 111978640 | A | * | 11/2020 | ............... C08L 23/14 |
| CN | 113121915 | A | * | 7/2021 | ............... C08L 23/12 |
| CN | 113150446 | A | * | 7/2021 | ............... C08L 23/12 |
| CN | 113799286 | A | * | 12/2021 | ............... B29B 9/06 |
| GB | 2534434 | A | | 7/2016 | |
| KR | 10-2020-0082850 | | * | 7/2020 | ............. C08K 3/042 |
| KR | 10-2020-0082851 | | * | 7/2020 | ............. C08K 3/042 |
| WO | 2020/169548 | A1 | | 8/2020 | |

OTHER PUBLICATIONS

CN 111187474 A (May 22, 2020); machine translation. (Year: 2020).*

Al-Saleh, M. et al., "Polypropylene/Graphene Nanocomposites: Effects of GNP Loading and Compatibilizers on the Mechanical and Thermal Properties", Materials; vol. 12, No. 3924; 11 pages; Nov. 27, 2019.

Li, Chao-Qun et al., "Mechanical and dielectric properties of graphene incorporated polypropylene nanocomposites using polypropylene-graft-maleic anhydride as a compatibilizer", Composites Science and Technology; vol. 153, pp. 111-118; Oct. 16, 2017.

Miquelard-Garnier, G. et al., "Dispersion of carbon nanotubes in polypropylene via multilayer coextrusion: Influence on the mechanical properties", Polymer, Elsevier; vol. 54, No. 16; 2013; pp. 4290-4297.

Prashantha, K. et al., "Multi-walled carbon nanotube filled polypropylene nanocomposites based on masterbatch route: Improvement of dispersion and mechanical properties through PP-g-MA addition", eXPRESS Polymer Letters vol. 2, No. 10; pp. 735-745; (2008).

Ribeiro, S. et al., "Effect of clays on the fire-retardant properties of a polyethylenic copolymer containing intumescent formulation", Science and Technology of Advanced Materials; vol. 9; 7 pages; Aug. 1, 2008.

Seo, H. et al., "Compatibility of Functionalized Graphene with Polyethylene and Its Copolymers", Hindawi Publishing Corp., Journal of Nanomaterials, vol. 2013, Article ID 805201; Sep. 2013; 8 pages.

Ullah, S. et al., "Advances and Trends in Chemically Doped Graphene", Advanced Materials Interfaces; vol. 7; 23 pages; (2020).

* cited by examiner

COMPOSITE MATERIAL INCLUDING THREE-DIMENSIONAL (3D) GRAPHENE AND MALEATED COPOLYMERS

TECHNICAL FIELD

This disclosure relates generally to composite materials, and more particularly, to composite materials including various loading levels of resin, maleated copolymer, and 3D graphene to achieve desirable visco-mechanical properties.

DESCRIPTION OF RELATED ART

Composite materials are produced from two or more constituent materials having dissimilar chemical and/or physical properties that may be merged such that the composite material has properties unlike the two or more constituent materials. In some instances, the constituent materials may remain separate and distinct, which may distinguish the composite materials from other substances, such as mixtures and solid solutions. Within composite materials, polypropylene-organoclay nanocomposites may be prepared via melt processing using a twin-screw extrusion of three constituent materials, such as polypropylene (PP), maleic anhydride modified polypropylene oligomers (PPgMA), and clays modified by octadecyl ammonium. In addition, PP and nano-clay may be compatibilized by varying a percentage of the PPgMA on the nanocomposite and/or a degree of functionalization of the PPgMA. Although some increases in physical performance (e.g., tensile strength, toughness, etc.) have been observed in relation to conventional materials, evaluated composites have not included three-dimensional (3D) graphene, which could impart beneficial properties. Improvements in composite materials are desirable.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

In various implementations, a composite material is disclosed to have a combination of thermoplastic resin mixed with a polypropylene-graft-maleic anhydride (PPgMA), and a plurality of carbon particles mixed in the combination. In some implementations, the plurality of carbon particles include a first region having a relatively low concentration of carbon particles, and a second region having a relatively high concentration of carbon particles, at least some of the plurality of carbon particles having exposed carbon surfaces with carbon atoms bonded to molecular sites on adjacent PPgMA molecules and oxidized with one or more oxygen-containing groups.

In various aspects, the composite material may also include a plurality of pores formed in the combination, where at least some of the pores are configured to be infiltrated by the PPgMA. In some instances, oxidation of at least some of the carbon atoms may be configured to increase chemically bonding between at least some of the PPgMA with adjacent carbon atoms. In other instances, interaction between at least some of the carbon atoms and their respective adjacent PPgMA molecules may be associated with maintaining a density of the composite material within $^+/_-$ 3% of a density of the thermoplastic resin.

In some implementations, the composite material may be characterized by one or more physical, chemical, mechanical, and/or other properties. For example, the density of the composite material may be based at least in part on a collective pore volume of the pores. In addition, in some instances, a chemical reaction between at least some carbon atoms and respective adjacent PPgMA molecules may change rheological properties of the composite material. In this way, the composite material may have a viscosity based on the thermoplastic resin, PPgMA, and at least some carbon particles within the composite material. For example, in some aspects, the viscosity of the composite material may be based on loading levels of carbon particles within the composite material. In some other aspects, the viscosity of the composite material may decrease proportionately to increases in loading levels of PPgMA within the composite material.

In addition, the composite material may have a viscosity between 2,100 pascal-seconds (Pa-s) and 500 Pa-s. Inclusion of carbon particles in the composite material may be associated with an increase in a flexural modulus and/or a tensile strength of the composite material. For example, in some aspects, the composite material may have a flexural modulus between 107,500 pounds per square inch (PSI) and 117,500 PSI at a temperature of 23° C. under ASTM D.790 at a 1% secant modulus value. In some instances, the composite material may be a maximum tensile elongation of up to 500%. The composite material may be produced to have a tunable melt flow rate between 4 grams per min (g/min) to 8 g/min at a temperature of 190° C. In addition, the increase in measured tensile strength may be between 30% to 100% relative to composite materials that do not include carbon particles. At least some carbon atoms may change chemical bonding behavior associated with respective surrounding atoms of the thermoplastic resin and PPgMA molecules by chemically reacting with the PPgMA molecules. For example, interaction between at least some of the carbon particles and their respective adjacent PPgMA molecules may be associated with an increase in mechanical reinforcement of the composite material between 1,000 pounds per square inch (PSI) to 1,100 PSI per one part per hundred (1 ppH) of PPgMA.

In one implementation, each of the carbon particles may be formed of one or more non-tri-zone particles and/or tri-zone particles. In some instances, each tri-zone particle may be formed of carbon fragments intertwined with each other and separated from one another by mesopores. A deformable perimeter may form upon coalescence with one or more adjacent non-tri-zone particles and/or tri-zone particles. In addition, each of the carbon particles may be formed of and/or include aggregates and agglomerates. For example, each aggregate may include a multitude of the tri-zone particles joined together and may have a principal dimension in a range between 10 nanometers (nm) and 10 micrometers (μm). Mesopores may be interspersed throughout the aggregates. Each mesopore may have a principal dimension between 3.3 nanometers (nm) and 19.3 nm. Each agglomerate may include a multitude of the aggregates joined to each other and each agglomerate having a principal dimension in an approximate range between 0.1 μm and 1,000 μm. Macropores may be interspersed throughout the aggregates. Each macropore may have a principal dimension between 0.1 μm and 1,000 μm. In some aspects, at least some carbon particles may act nano-reinforcing members within the composite material. In this way, maleic anhydride (MA) may react with at least some of the nano-reinforcing members. In addition, polypropylene (PP) may increase interfacial interaction between at least some of the nano-reinforcing members and the thermoplastic resin.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
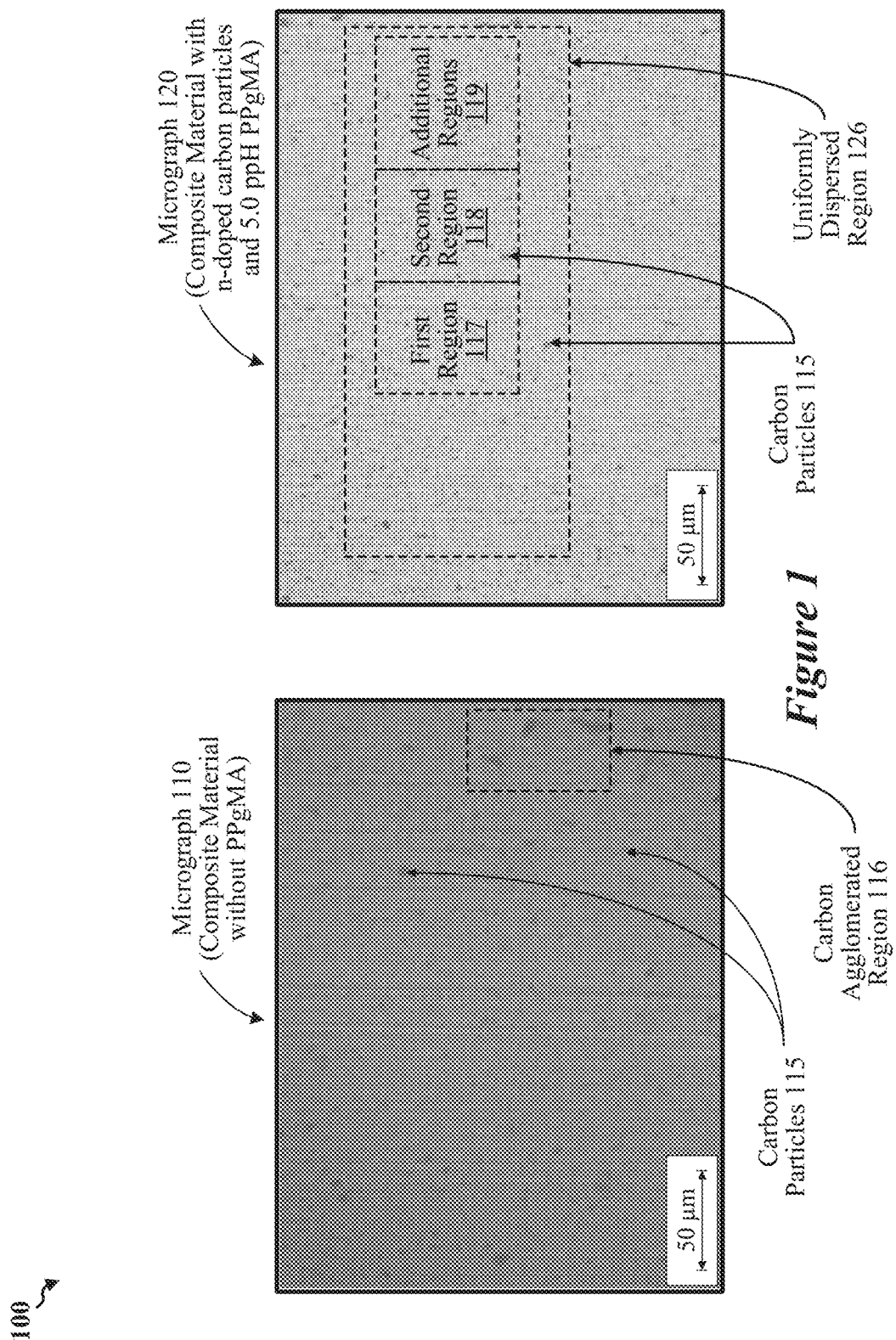
FIG. 1 shows micrographs of example composite materials, according to some implementations.

The following description is directed to some example implementations for the purposes of describing innovative aspects of this disclosure. However, a person having ordinary skill in the art will readily recognize that the teachings herein can be applied in a multitude of different ways. The described implementations can be implemented in any type of material and can be used to provide a formative material used to protect cases, coolers, phones, flashlights, travel gear, luggage, drinkware, backpacks, or the like. As such, the disclosed implementations are not to be limited by the examples provided herein, but rather encompass all implementations contemplated by the attached claims. Additionally, well-known elements of the disclosure will not be described in detail or will be omitted so as not to obscure the relevant details of the disclosure.

As described above, a composite material is produced from two or more constituent materials having dissimilar chemical and/or physical properties. Typical engineered composite materials include reinforced concrete and masonry composite wood, such as plywood, reinforced plastics, such as fiber-reinforced polymer or fiberglass ceramic matrix composites (e.g., composite ceramic and metal matrices), metal matrix composites (MMCs), and/or other advanced composite materials. Composite materials tend to be less expensive, lighter, stronger, and/or more durable than common materials or their constituent (e.g., formative) materials.

Composite materials may be applied in a wide array of end-use application areas, such as sensing, actuation, computation, and communication into composites ("robotic materials"). Composite materials may also be used in constructing and/or forming buildings, bridges, structures (e.g., boat hulls and swimming pool panels), racing car bodies, shower stalls, bathtubs, storage tanks, imitation granite, cultured marble sinks and countertops, or the like. Composite materials may be used in general automotive applications, such as exposed paneling and impact absorption (e.g., for bumpers). Some composite materials may be produced for spacecraft and/or aircraft, which may travel at more than 1,000 miles per hour in demanding environments, such as outer space.

Interleaving stiff and brittle epoxy based carbon fiber reinforced polymer laminates with flexible thermoplastic laminates can increase toughness of composite materials, and thus increase impact resistance. Such interleaved composites demonstrate shape memory behavior without additional shape memory polymers and/or shape memory alloys, such as PVC and carbon fiber reinforced polymer laminates interleaved with polystyrene. Composite materials may include various types or classes, such as sandwich-structured composite materials, which may be formed by attaching two relatively thin and stiff skins to a lightweight and thick core. Although a core material of a composite material may be relatively weak, its higher thickness may provide a sandwich composite relatively high bending stiffness while maintaining a relatively low density.

In addition, polyethylene (PE) and polypropylene (PP) blends appear to increase efficiency for polymer waste recycling while maintaining overall throughput sustainability. However, as the polyolefins are thermodynamically immiscible, they may form a binary system with decreased performance (e.g., less toughness, etc.) as compared with the characteristics of various homopolymers. PE/PP blend compatibilization can be used to develop high-performance and cost-effective products, such as by using reactive and/or non-reactive compatibilization techniques to increase a brittle to ductile transition for the PE/PP blends. Nevertheless, products resulting from such techniques often fail to meet the requirements for commercial applications with relatively high demands. To address this, some PE/PP blend modifications may include reinforcing synthetic or natural filler to have tailored properties.

Aspects of the present disclosure recognize that certain composite materials may benefit from uniformly incorporating carbon particles throughout various blends. Unfortunately, relatively high carbon loading levels (e.g., >10 weight percent (wt. %)) may result in undesirable aggregation (e.g., clumping) of the carbon materials, which may result in uncontrolled increases in viscosity and exceed rheological specifications provided by customers. While the relatively unpredictable and uncontrollable aggregation of carbon particles may undesirably change physical properties (e.g., toughness) of composite materials, composite materials with no carbon may not possess certain physical properties (such as controlled brittleness) that carbon can provide.

Various aspects of the subject matter disclosed herein relate to a composite material, which may be formed from a combination of thermoplastic resin mixed with polypropylene-graft-maleic anhydride (PPgMA). Carbon particles may be mixed in the combination. In this way, the composite material may include between 80 wt. % and 90 wt. % of the thermoplastic resin, between 0.5 wt. % and 15 wt. % of PPgMA, and between 0.1 wt. % to 7 wt. % of carbon particles. Each carbon particle may be formed from interconnected three-dimensional (3D) graphenated materials (e.g., referred to as "3D graphene") self-nucleated without a seed particle. In addition, each carbon particle may have an exposed carbon surface with carbon atoms bonded to molecular sites on adjacent PPgMA molecules. At least some carbon atoms may be oxidized with one or more oxygen-containing groups. In some instances, oxidizing carbon atoms may increase PPgMA molecules chemically bonding with adjacent carbon atoms per unit volume, and thus interaction between carbon atoms and PPgMA molecules may maintain a composite material density within $^+/_-$ 3% of thermoplastic resin density and/or produce a predictable rheological profile, such as with viscosity levels between 2,100 pascal-seconds (Pa·S) and approximately 700 Pa·S.

FIG. 1 shows micrographs 100 of example composite materials, according to some implementations. The micrographs 100 include a first micrograph 110, which depicts a composite material without polypropylene-graft-maleic anhydride (PPgMA), and a second micrograph 120, which depicts a composite material including nitrogen-doped (n-doped) carbon particles and polypropylene-graft-maleic anhydride (PPgMA) at a loading level of 5.0 parts per hundred (ppH). The first micrograph 110 depicts carbon particles 115 which may cluster together to form one or more instances of a carbon agglomerated region 116. Carbon agglomeration in composite materials may result in uncontrolled increases in viscosity, typically exceeding desired rheological specifications and are therefore undesirable for many end-use application areas. Alternatively, the micrograph 120 depicts carbon particles 115 throughout one or more instances of a uniformly dispersed region 126. The relatively uniform distribution of the carbon particles 115 throughout the uniformly dispersed region 126 may be attributed to an inclusion of PPgMA, which may infiltrate void regions (not shown for simplicity) in the carbon particles 115. The carbon particles 115 may thus be at least partially separated by, for example, interconnected PPgMA molecular units to form the uniformly dispersed region 126, which may cause the composite material to have a predictable rheological profile, such as predictable density and/or viscosity values.

In some aspects, the composite material may be post-processed by injection molding and used as a formative material for cases, coolers, phone cases, flashlights, travel gear, luggage, drinkware, backpacks, or the like. In addition, the composite material depicted in the micrograph 120 may be used as a formative material in a variety of end-use application areas in several industries, including (but not limited to) agriculture, construction, floor cleaning machinery, water treatment, outdoor (e.g., lawn and garden), environmental products, marine, aerospace, recreational equipment, sporting equipment, toys, furniture, medical, consumer articles, large containers, tanks, boxes, or the like. In some instances, fabrication methods used to produce the composite material include rotational molding, injection molding, blow molding, vacuum forming, thermoforming, extrusion, additive manufacturing (e.g., 3D printing), polymer casting, or another appropriate fabrication method.

In some instances, the composite material is formed by a combination of a thermoplastic resin and maleated copolymers, maleic copolymers, and/or maleated polymers. In some aspects, the thermoplastic resin may be or include a linear low-density polyethylene (LLDPE) resin including an ethylene-butene copolymer and/or alpha-olefins. In some other aspects, the thermoplastic resin may be or include any type of polyethylene system, including LLDPE, linear polyethylene (LPE), metallocene polyethylene (mPE), high-density polyethylene (HDPE), ultra-high molecular weight (UHMW) polyethylene (PE) (UHMWPE), nylons, polypropylene, polyether ether ketone (PEEK), or the like. The thermoplastic resin may also be or include any type of semi-crystalline and amorphous thermoplastic materials.

Example semi-crystalline thermoplastic materials may be opaque, flexible, and chemical-resistant and include standard thermoplastics (e.g., polypropylene (PP), high-density polyethylene (PE-HD or HDPE), low-density polyethylene (PE-LD or LDPE), and/or linear low density polyethylene (PE-LLD or LLDPE)), engineering thermoplastics (e.g., nylon 46 or polyamide 46 (PA46), polyphthalamide (PPA), syndiotactic polystyrene (SPS), thermoplastic elastomer (TPE), polybutylene terephthalate (PBT), polyethylene terephthalate (PET), polyoxymethylene (POM), nylon 6,6 or polyamide 6,6 and nylon 6 or polyamide 6 (PA66 and PA6, respectively), and/or high-performance thermoplastics (e.g., polyether ketone (PEK), PEEK, polyphenylene sulfide (PPS), and/or polypropylene 11/12 (PP 11/12)).

Example amorphous thermoplastic materials may be transparent, brittle, and not chemical-resistant and include standard thermoplastics (e.g., acrylonitrile butadiene styrene (ABS), polystyrene high-impact (PS-HI), polystyrene (PS), and/or polyvinylchloride (PVC)), engineering thermoplastics (e.g., polycarbonate (PC), polycarbonate polyethylene terephthalate (PC/PET), a thermoplastic alloy of (PC) polycarbonate and (ABS) acrylonitrile-butadiene-styrene (PC/ABS), modified polyphenylene ether (m-PPE), poly (methyl methacrylate) (PMMA), and/or styrene acrylonitrile (SAN)), and/or high-performance thermoplastics (e.g., polyamide-imides (PAI), polyphenylsulfone (PPSU), polysulfone (PSU), and/or polyethersulfone (PES)).

In some implementations, the thermoplastic resin may be mixed with polypropylene-graft-maleic anhydride (PPgMA) (or "maleated polypropylene"). In some instances, the PPgMA may have a PP content between 80 weight percent (wt. %) and 99.9 wt. % with a corresponding balance of maleic anhydride (MA) content between 20 wt. % and 0.01 wt. %. In some other implementations, the thermoplastic resin may be mixed with polypropylene-co-acrylic acid (PP-co-AA), polyethylene-co-acrylic acid (PE-co-AA) or with a maleated copolymer including, for example, polyethylene-graft-maleic anhydride (PE-g-MA), polyethylene-alt-maleic anhydride (PE-alt-MA), polyisoprene-graft-maleic anhydride (PI-g-MA), polystyrene-graft-maleic anhydride (PS-g-MA), or polystyrene-block-poly(ethylene-ran-butylene)-block-polystyrene-graft-maleic anhydride. In such implementations, the maleated copolymer may have a polymer (e.g., PP, PE, polyisoprene (PI), or PS content between 80 weight percent (wt. %) and 99.9 wt. % and a maleic anhydride (MA) content between 20 wt. % and 0.01 wt. %, and thus the composite material may include between 98.7 wt. %-100 wt. % polypropylene (PP) and between 0.0 wt. %-1.3 wt. % maleic anhydride (MA).

In some implementations, the carbon particles 115 may be mixed such that the composite material includes between 80 wt. % and 90 wt. % of thermoplastic resin, between 0.5 wt. % and 15 wt. % of PPgMA, and between 0.1 wt. % to 7 wt. % of carbon particles. Each of the carbon particles may include carbon atoms chemically bonded to adjacent atoms of the thermoplastic resin and/or PPgMA, and the PPgMA may thus be a compatibilizer between the carbon particles and the thermoplastic resin. In some aspects, the carbon particles include a first region 117 having a relatively low concentration of carbon particles per unit volume and a second region 118 having a relatively high concentration of carbon particles per unit volume. The first region 117 may be positioned adjacent to the second region 118. In some instances, the carbon particles have one or more additional regions 119 that each have a different (e.g., higher or lower) concentration level than the immediately preceding region. Any one or more of the first region 117, the second region 118, and the one or more additional regions 119 may be sized identically or different to any other region. In this way, the carbon particles 115 may be organized to attain predefined concentration levels per unit volume throughout the composite material.

In some implementations, the carbon particles 115 have exposed carbon surfaces with carbon atoms (not shown for simplicity) bonded to molecular sites on adjacent PPgMA molecules. The carbon atoms may be oxidized with one or more oxygen-containing groups. Interaction between the carbon atoms and their adjacent PPgMA molecules may maintain a density of the composite material within $^+/_-$ 3% of a density of the thermoplastic resin. Pores may be formed within and/or between at least some of the carbon particles 115, the thermoplastic resin, and PPgMA, such that at least some of the pores may be infiltrated by PPgMA. In some aspects, each pore may have a pore volume between 0.05 cubic centimeters per gram ($cm^3/g$) and 1.5 $cm^3/g$. In addition, oxidation of carbon atoms may increase chemical bonding of PPgMA with adjacent carbon atoms per unit volume. In some instances, carbon particles may be formed from one or more interconnected crinkled 3D graphene sheets or non-hollow carbon spherical particles (NHCS).

The composite material may be characterized by one or more physical, chemical, mechanical, and/or other properties. For example, a density of the composite material may be based at least in part on a collective pore volume of the pores. In some instances, at least some carbon atoms may chemically react with adjacent PPgMA molecules, changing rheological properties of the composite material. In this way, the composite material may have a viscosity based on the thermoplastic resin, PPgMA, and the at least some carbon particles. In some aspects, the viscosity of the composite material may be based on loading levels of carbon particles within the composite material. In some other aspects, the viscosity of the composite material may decrease proportionately to increases in loading levels of PPgMA within the composite material.

In some aspects, the composite material may have a viscosity between 2,100 pascal-seconds (Pa-s) and 500 Pa-s. In some instances, including carbon particles in the composite material may increase a flexural modulus and/or a tensile strength of the composite material. For example, the composite material may have a flexural modulus between 107,500 pounds per square inch (PSI) and 117,500 PSI at a temperature of 23° C. under ASTM D.790 at a 1% secant modulus value. In some instances, the composite material may have a maximum tensile elongation of 500%. The composite material may have a tunable melt flow rate between 4 grams per min (g/min) to 8 g/min at a temperature of 190° C. In addition, the tensile strength of the composite material may be 30% to 100% higher than composite materials not including carbon particles. At least some carbon atoms may change chemical bonding behavior associated with surrounding atoms of the thermoplastic resin and PPgMA molecules by chemically reacting with the PPgMA molecules. For example, interaction between at least some of the carbon particles and their respective adjacent PPgMA molecules may increase a mechanical reinforcement of the composite material by 1,000 PSI to 1,100 PSI per one part per hundred (1 ppH) of PPgMA.

In at least one implementation, the carbon particles may be formed of one or more non-tri-zone particles and/or tri-zone particles not shown for simplicity. In some instances, each of the tri-zone particle may be formed of intertwined carbon fragments separated by mesopores not shown for simplicity. A deformable perimeter may form upon coalescence with the one or more non-tri-zone particles and/or tri-zone particles. In addition, the carbon particles may be formed of and/or include aggregates and agglomerates. In some instances, each aggregate includes joined tri-zone particles and a principal dimension between 10 nanometers (nm) and 10 micrometers (μm). In some instances, mesopores are interspersed throughout the aggregates, and each mesopore may have a principal dimension between 3.3 nanometers (nm) and 19.3 nm. Each agglomerate may include joined aggregates that each have a principal dimension between approximately 0.1 μm and 1,000 μm. In some instances, macropores are interspersed throughout the aggregates, and each macropore may have a principal dimension between 0.1 μm and 1,000 μm. In some aspects, at least some of the carbon particles function as nano-reinforcing members within the composite material. In this way, the MA may react with at least some of the nano-reinforcing members. In addition, PP may increase interfacial interaction between at least some of the nano-reinforcing members and the thermoplastic resin.

Figure 2:
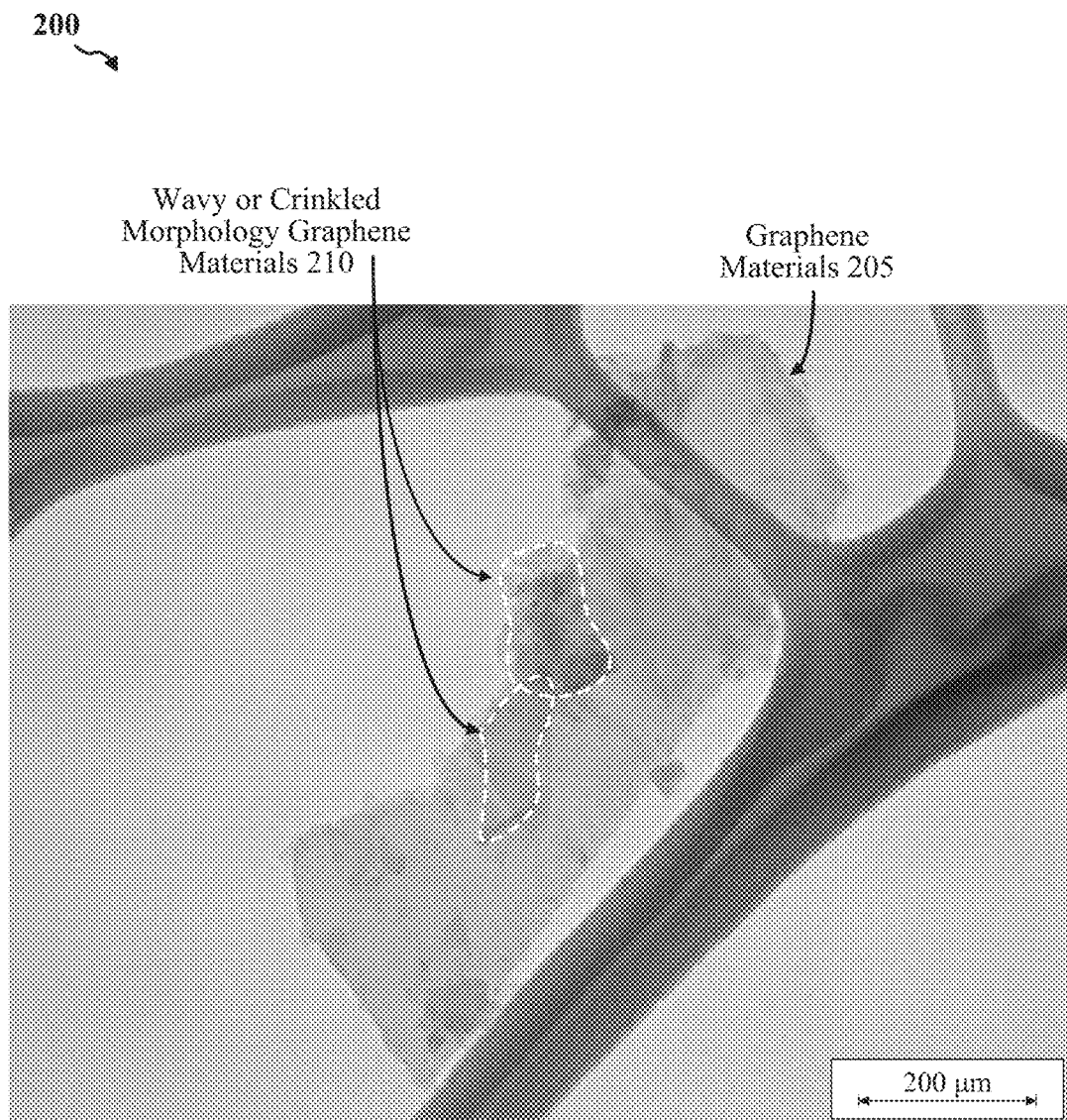
FIG. 2 shows a micrograph of graphene materials produced by sulfuric acid ($H_2SO_4$) exfoliation from graphite, according to some implementations.

FIG. 2 shows a micrograph 200 of graphene materials 205 produced by sulfuric acid ($H_2SO_4$) exfoliation from graphite, according to some implementations. In some aspects, at least some of the graphene materials 205 coalesce with one or more additional instances of the graphene materials 205 and produce at least some of the carbon particles 115 depicted in FIG. 1. In some other aspects, a shape and/or a morphology of at least some of the graphene materials 205 is and/or resembles a flat nanoplatelet. In addition, at least some of the graphene materials 205 may have a "wavy" or "crinkled" morphology 210, which may indicate that at least some flat nanoplatelets are adjoined at one or more defined angles (rather than a straight, flat, or 180° angle), which may result in a surface area to volume ratio per unit volume being relatively higher than for non-wavy or non-crinkled graphene materials.

Figure 3:
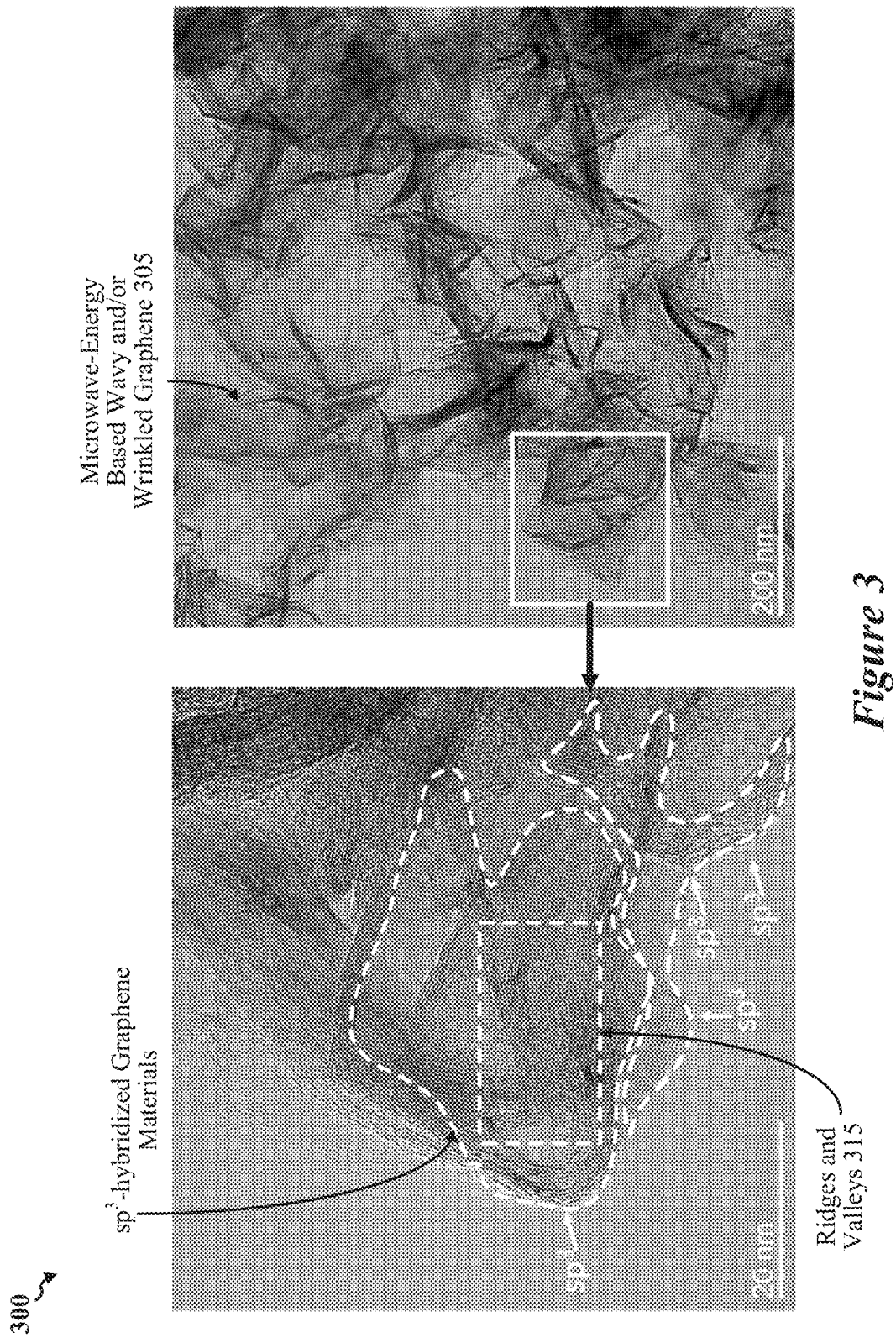
FIG. 3 shows micrographs of microwave-energy based wavy and/or wrinkled graphene, according to some implementations.

FIG. 3 shows micrographs 300 of microwave-energy based wavy and/or wrinkled graphene 305, according to some implementations. In some instances, at least some of the microwave-energy based wavy and/or wrinkled graphene 305 may coalesce with one or more additional instances of itself to produce at least some of the carbon particles 115 depicted in the micrograph 120 of FIG. 1. In addition, at least some of the microwave-energy based wavy and/or wrinkled graphene 305 may be one example of the graphene materials 205 of FIG. 2. In some aspects, at least some graphene nanoplatelets of the microwave-energy based wavy and/or wrinkled graphene 305 may adjoin together to define various ridges and valleys 315. In this way, at least some of the ridges and valleys 315 may produce areas of increased flexibility within the microwave-energy based wavy and/or wrinkled graphene 305, which may be suitable for infiltration by, for example, a polymeric substance (e.g., PPgMA and/or the like). In some aspects, $sp^a$-hybridized polymeric chains (e.g., polyethylene, PE), may demonstrate increased flexibility relative to $sp^2$-C chain conjugated polymers (e.g., poly(p-phenylene).

Figure 4:
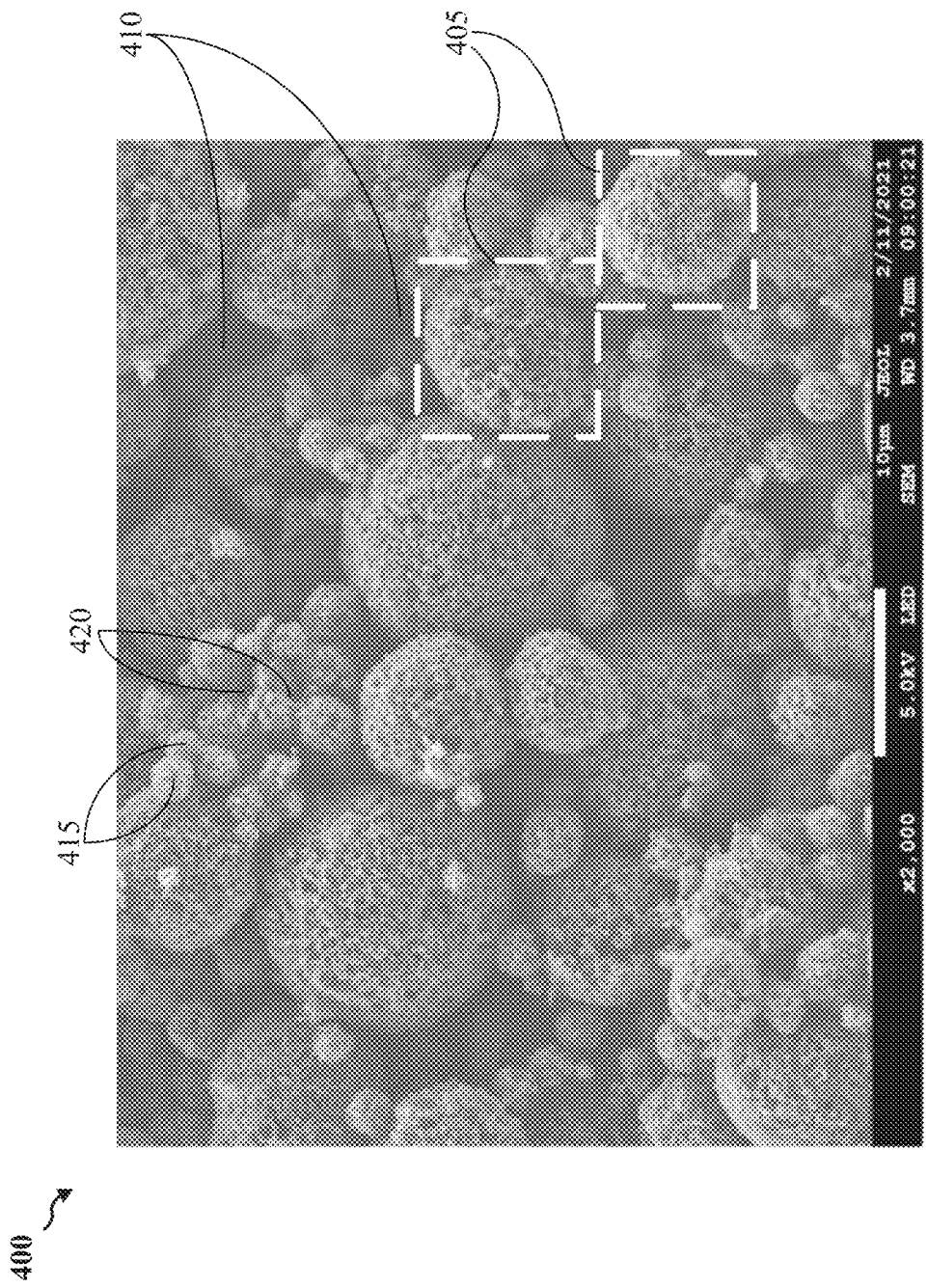
FIG. 4 shows a micrograph of example carbon particles, according to some implementations.

FIG. 4 shows a micrograph 400 of example carbon particles, according to some implementations. In some aspects, at least some of the carbon particles 405 may each be one example of one or more of the carbon particles 115 depicted by the micrograph 120 of FIG. 1. In addition, at least some of the carbon particles 405 may be formed upon coalescence of several instances of the graphene materials 205 and/or the microwave-energy based wavy and/or wrinkled graphene 305. In some instances, the carbon particles 405 may be separated from one another by a first multitude of pores 410 formed between adjacent instances of the carbon particles 405. As shown in FIG. 4, each of the carbon particles 405 may be a porous structure containing additional multitudes of pores (e.g., including a second multitude of pores 420) produced by overlapping secondary carbon particles 415. In various implementations, an average size of the first multitude of pores 410 may be larger than an average size of the second multitude of pores 420. In various implementations, the second multitude of pores may be large enough to enable PPgMA molecules and/or other substances to infiltrate at least some of the carbon particles 405 to thereby produce, for example, the composite material depicted in the micrograph 120 of FIG. 1.

Figure 5A:
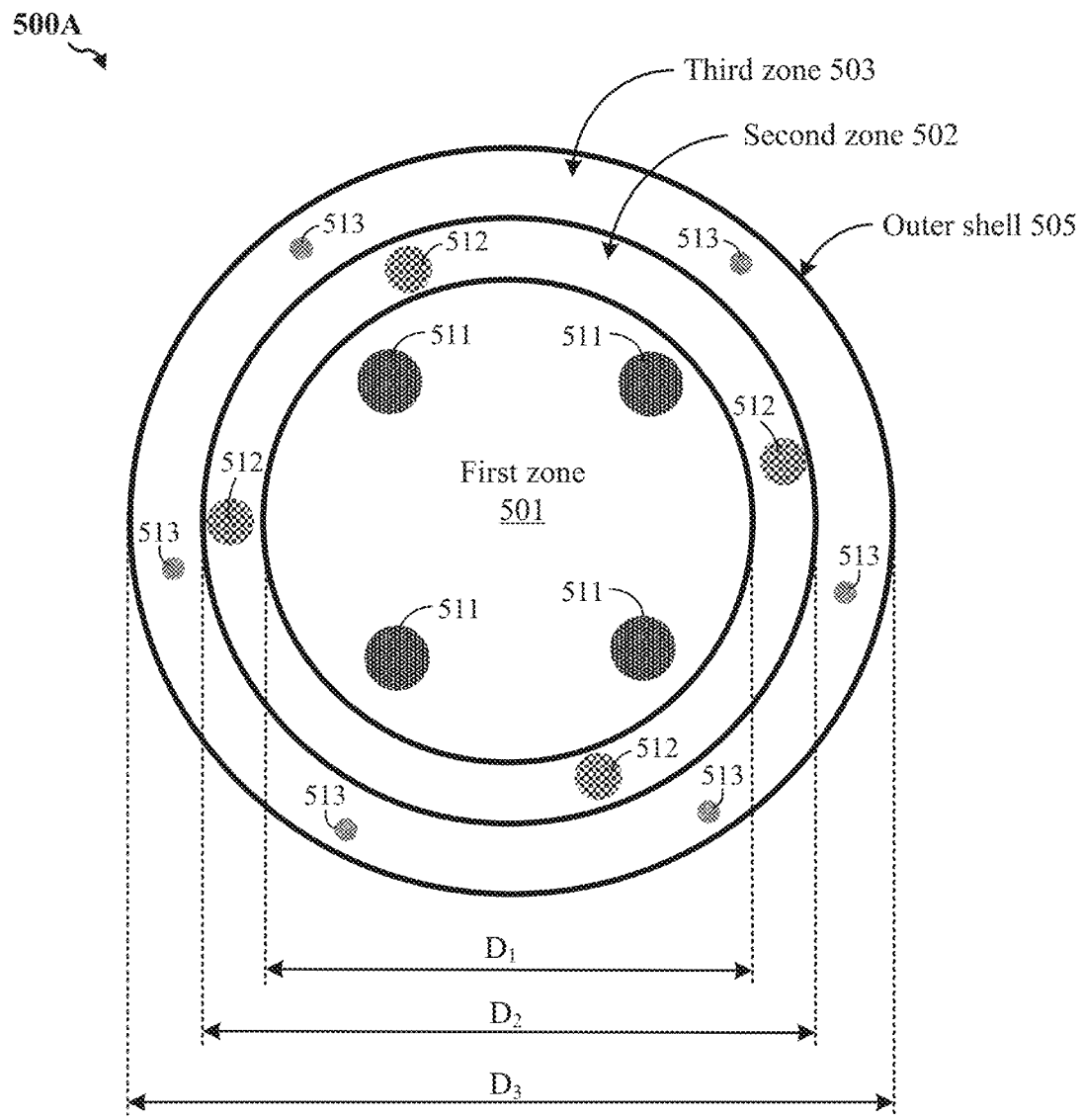
FIG. 5A shows a diagram of an example carbon particle, according to some implementations.

FIG. 5A shows a diagram of an example of a carbon particle (e.g., a tri-zone particle) shown in FIG. 4, according to some implementations. In various implementations, the tri-zone particle 500A may be one example of any one or more of the carbon particles 115 depicted by the micrograph 120 of FIG. 1. The tri-zone particle 500A may include three discrete zones such as (but not limited to) a first zone 501, a second zone 502, and a third zone 503. In some aspects, each of the zones 501-503 surrounds and/or encapsulates a preceding zone. For example, the first zone 501 may be surrounded by or encapsulated by the second zone 502, and the second zone 502 may be surrounded by or encapsulated by the third zone 503. The first zone 501 may correspond to an inner region of the tri-zone particle 500A, the second zone 502 may correspond to an intermediate transition region of the tri-zone particle 500A, and the third zone 503 may correspond to an outer region of the tri-zone particle 500A. In some aspects, the tri-zone particle 500A may include a permeable shell 505 that deforms in response to contact with one or more adjacent non-tri-zone particles and/or tri-zone particles 500A.

In some implementations, the first zone 501 may have a relatively low density, a relatively low electrical conductivity, and a relatively high porosity, the second zone 502 may have an intermediate density, an intermediate electrical conductivity, and an intermediate porosity, and the third zone 503 may have a relatively high density, a relatively high electrical conductivity, and a relatively low porosity. In some aspects, the first zone 501 may have a density of carbon material between approximately 1.5 g/cc and 5.0 g/cc, the second zone 502 may have a density of carbon material between approximately 0.5 g/cc and 3.0 g/cc, and the third zone 503 may have a density of carbon material between approximately 0.0 and 1.5 g/cc. In other aspects, the first zone 501 may include pores having a width between approximately 0 and 40 nm, the second zone 502 may include pores having a width between approximately 0 and 35 nm, and the third zone 503 may include pores having a width between approximately 0 and 30 nm. In some other implementations, the second zone 502 may not be defined for the tri-zone particle 500A. In one implementation, the first zone 501 may have a principal dimension $D_1$ between approximately 0 nm and 100 nm, the second zone 502 may have a principal dimension $D_2$ between approximately 20 nm and 150 nm, and the third zone 503 may have a principal dimension $D_3$ of approximately 200 nm.

Aspects of the present disclosure recognize that the unique layout of the tri-zone particle 500A and the relative dimensions, porosities, and electrical conductivities of the first zone 501, the second zone 502, and the third zone 503 can be selected and/or modified achieve a desired balance between minimizing the polysulfide shuttle effect and maximizing the specific capacity of a host battery. Specifically, in some aspects, the pores may decrease in size and volume from one zone to other. In some implementations, the tri-zone particle may consist entirely of one zone with a range of pore sizes and pores distributions (e.g., pore density). For the example of FIG. 5A, the pores 511 associated with the first zone 501 or the first porosity region have relatively large widths and may be defined as macropores, the pores 512 associated with the second zone 502 or the second porosity region have intermediate-sized widths and may be defined as mesopores, and the pores 513 associated with the third zone 503 or the third porosity region have relatively small widths and may be defined as micropores.

A group of tri-zone particles 500A may be joined together to form an aggregate (not shown for simplicity), and a group of the aggregates may be joined together to form an agglomerate (not shown for simplicity). In some implementations, a plurality of mesopores may be interspersed throughout the aggregates formed by respective groups of the carbon particles 500A. In some aspects, a first porosity region may be at least partially encapsulated by the second porosity region such that a respective aggregate may include one or more mesopores and one or more macropores. In one implementation, each mesopore may have a principal dimension between 3.3 nanometers (nm) and 19.3 nm, and each macropore may have a principal dimension between 0.1 μm and 1,000 μm. In some instances, the tri-zone particle 500A may include carbon fragments intertwined with each other and separated from one another by at least some of the mesopores.

In some implementations, the tri-zone particle 500A may include a surfactant or a polymer that includes one or more of styrene butadiene rubber, polyvinylidene fluoride, poly acrylic acid, carboxyl methyl cellulose, polyvinylpyrrolidone, and/or polyvinyl acetate that can act as a binder to join a group of the carbon materials together. In other implementations, the tri-zone particle 500A may include a gel-phase electrolyte or a solid-phase electrolyte disposed within at least some of the pores.

In some implementations, the tri-zone particle 500A may have a surface area of exposed carbon surfaces in an approximate range between 10 $m^2$/g to 3,000 $m^2$/g and/or a composite surface area (including other substances such as PPgMA micro-confined within pores) in an approximate range between 10 $m^2$/g to 3,000 $m^2$/g. In one implementation, a composition of matter including a multitude of tri-zone particles 500A may have an electrical conductivity in an approximate range between 100 S/m to 20,000 S/m at a pressure of 12,000 pounds per square in (psi) and a sulfur to carbon weight ratio between approximately 1:5 to 10:1.

Figure 5B:
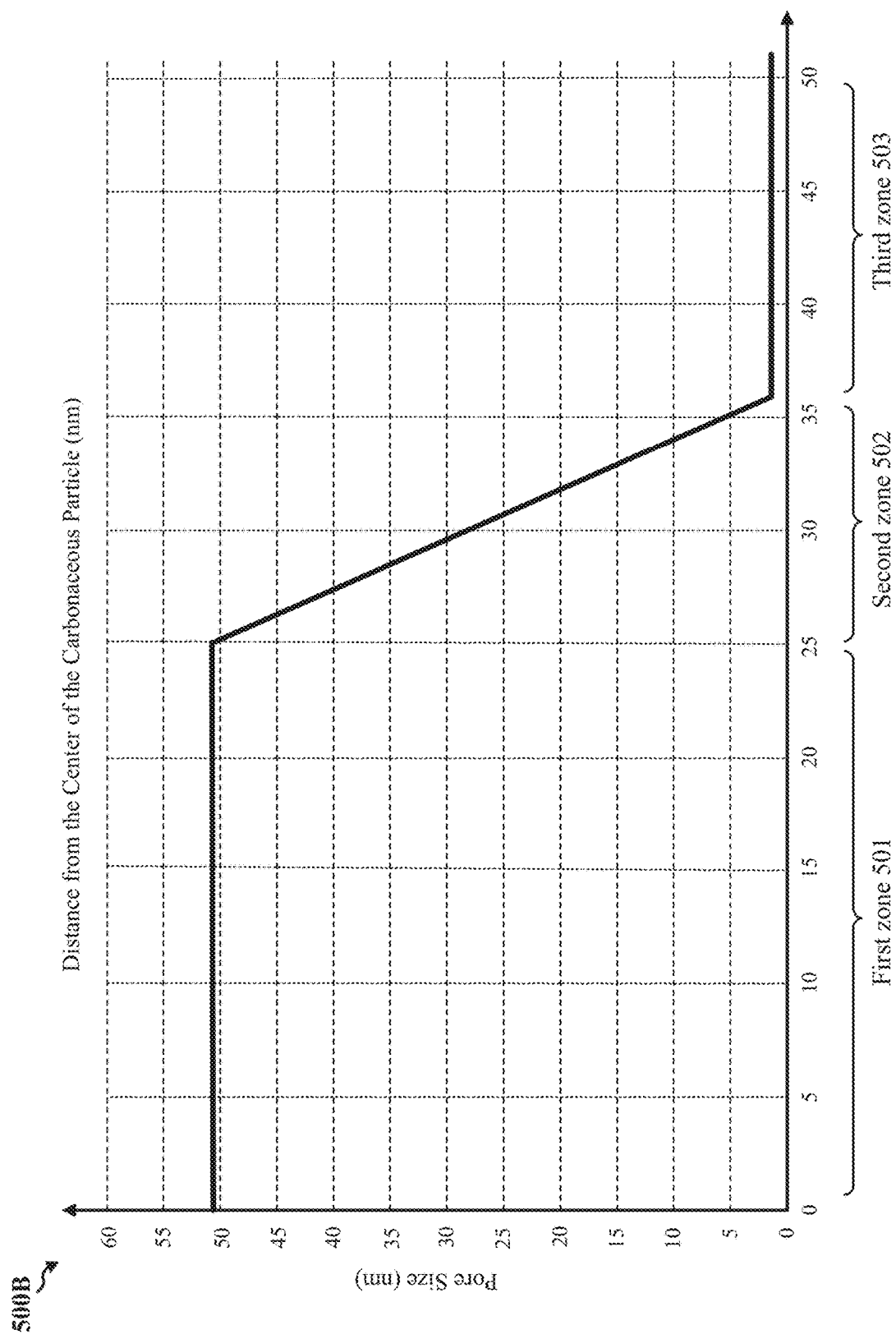
FIG. 5B shows an example step function representative of the example carbon particle of FIG. 5A, according to some implementations.

FIG. 5B shows an example step function representative of the tri-zone particle of FIG. 5A, according to some implementations. As discussed, the pores distributed throughout the tri-zone particle 500A may have different sizes, volumes, or distributions. In some implementations, the average pore volume may decrease based on a distance between a center of the tri-zone particle 500A and an adjacent zonae, for example, such that pores associated with the first zone 501 or the first porosity region have a relatively large volume or pore size, pores associated with the second zone 502 or the second porosity region have an intermediate volume, and pores associated with the third zone 503 or the third porosity region have a relatively small volume. The interior region has a higher pore volume than the regions near the periphery. The region with higher pore volume provides for high sulfur loading whereas the lower pore volume outer regions mitigate the migration of polysulfides during cell cycling. In the example of FIG. 5B, the average pore volume in the inner region is approximately $3^{cc}/_g$, the average pore volume in the outermost region is approximately $0.5^{cc}/_g$ and the average pore volume in the intermediate region is between $0.5^{cc}/_g$ and $3^{cc}/_g$.

Figure 6:
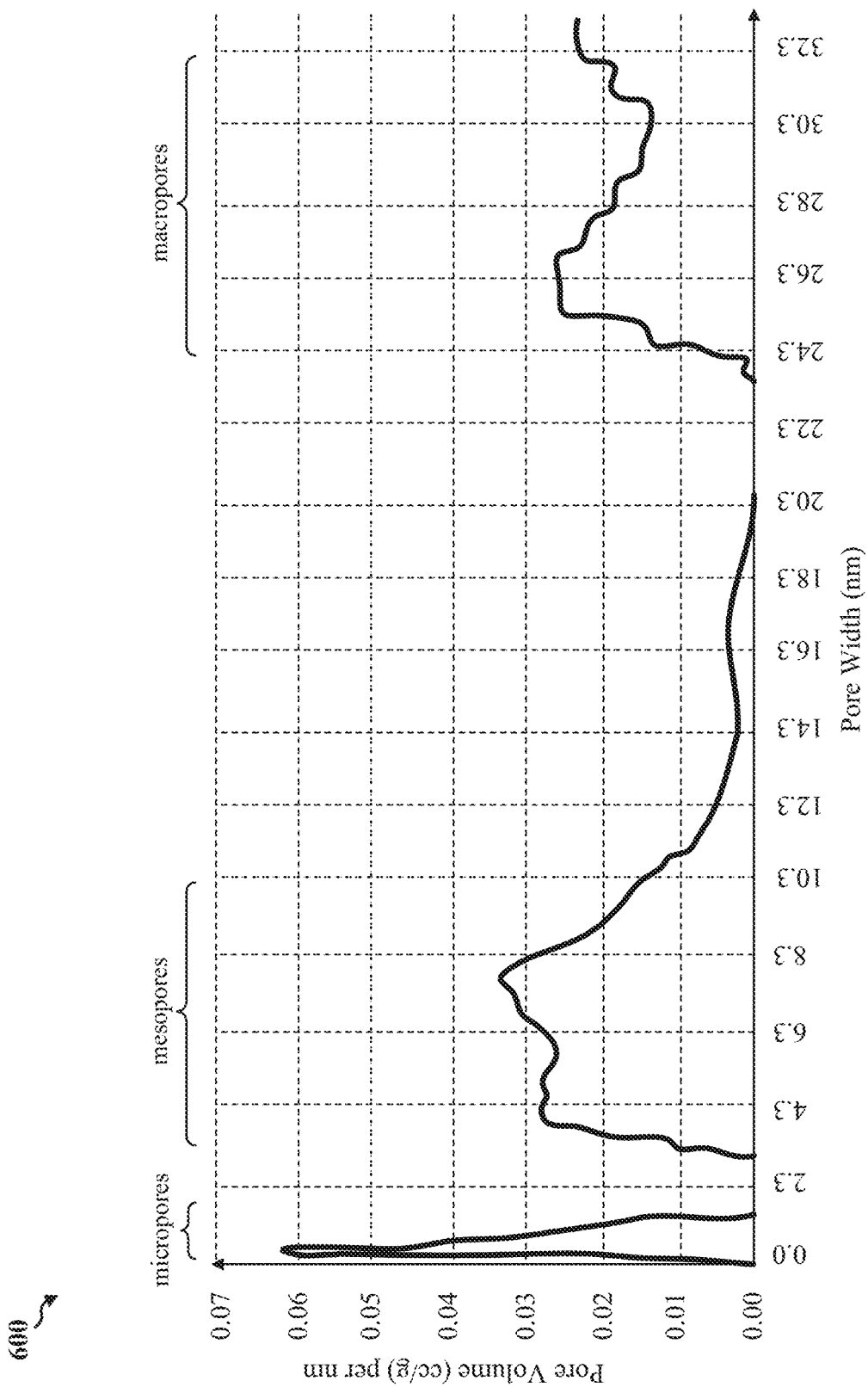
FIG. 6 shows a graph depicting an example distribution of pore volume versus pore width of an example carbon particle, according to some implementations.

FIG. 6 shows a graph depicting an example distribution of pore volume versus pore width of an example carbon particle, according to some implementations. As depicted in the graph 600, pores associated with a relatively high pore volume may have a relatively low pore width, for example, such that the pore width generally increases as the pore volume decreases. In some aspects, pores having a pore width less than approximately 1.0 nm may be referred to as micropores, pores having a pore width between approximately 3 and 11 nm may be referred to as mesopores, and pores having a pore width greater than approximately 24 nm may be referred to as macropores.

Figures 7A, 7B:
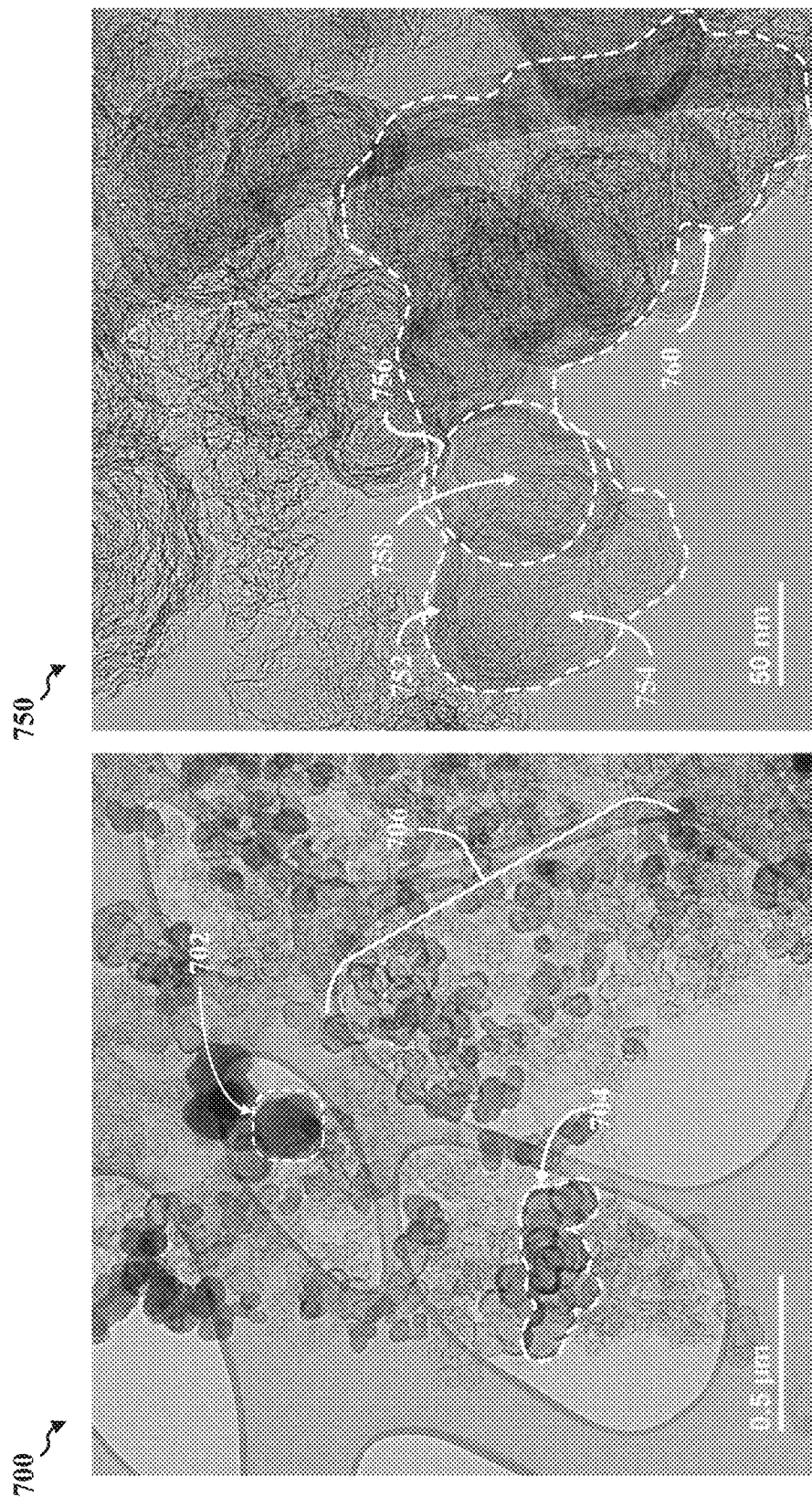
FIG. 7A shows a micrograph of example carbon particles, aggregates, and/or agglomerates, according to some implementations.
FIG. 7B shows a micrograph of example carbon particles, aggregates, and/or agglomerates, according to some implementations.

FIG. 7A shows a micrograph 700 of example carbon particles, aggregates, and/or agglomerates depicted in FIG. 4 and/or FIG. 5A, according to some implementations. In some aspects, the carbon particles depicted in FIG. 7A may be one example of the carbon particles 115 depicted in the micrograph 120 of FIG. 1 and/or other carbon particles described in the present disclosure. In some implementations, each of the carbon structures 702 may have a substantially hollow a core region surrounded by various monolithic carbon growths and/or layering. In some aspects, the monolithic carbon growths and/or layering may be examples of the various carbon structures, growths and/or layering described with reference to FIGS. 2 through 4. In some instances, the carbon structures 702 may include several concentric multi-layered fullerenes and/or similarly shaped carbon structures organized at varying levels of density and/or concentration. For example, the actual final shape, size, and graphene configuration of each of the carbon structures 702 may depend on various manufacturing processes. The carbon structures 702 may, in some aspects, demonstrate poor water solubility. As such, in some implementations, non-covalent functionalization may be utilized to alter one or more dispersibility properties of the carbon structures 702 without affecting the intrinsic properties of the underlying carbon nanomaterial. In some aspects, the underlying carbon nanomaterial may be formative a $sp^2$ carbon nanomaterial. In some implementations, each of the carbon structures 702 may have a diameter between approximately 20 and 500 nm. In various implementations, groups of the carbon structures 702 may coalesce and/or join together to form the aggregates 704. In addition, groups of the aggregates 704 may coalesce and/or join together to form the agglomerates 706. In some aspects, one or more of the carbon structures 702, the aggregates 704, and/or the agglomerate 706 may be used to form one or more of the carbon particles 115 depicted in the micrograph 120 of FIG. 1.

FIG. 7B shows a micrograph 750 of an aggregate formed of carbon material, according to some implementations. In some implementations, the aggregate 760 may be an example of one of the aggregates 704 of FIG. 7A. In one implementation, exterior carbon shell-type structures 752 may fuse together with carbons provided by other carbon shell-type structures 754 to form a carbon structure 756. A group of the carbon structures 756 may coalesce and/or join with one another to form the aggregate 760. In some aspects, a core region 758 of each of the carbon structures 756 may be tunable, for example, in that the core region 758 may include various defined concentration levels of interconnected graphene structures and/or carbon particles, as described with reference to FIG. 5A and/or FIG. 5B. In some implementations, some of the carbon structures 756 may have a first concentration of interconnected carbons approximately between 0.1 g/cc and 2.3 g/cc at or near the exterior carbon shell-type structure 752. Each of the carbon structures 756 may have pores to transport lithium cations (Lit) extending inwardly from toward the core region 758.

In some implementations, the pores in each of the carbon structures 756 may have a width or dimension between approximately 0.0 nm and 0.5 nm, between approximately 0.0 and 0.1 nm, between approximately 0.0 and 6.0 nm, or between approximately 0.0 and 35 nm. Each carbon structures 756 may also have a second concentration at or near the core region 758 that is different than the first concentration. For example, the second concentration may include several relatively lower-density carbon regions arranged concentrically. In one implementation, the second concentration may be lower than the first concentration at between approximately 0.0 g/cc and 1.0 g/cc or between approximately 1.0 g/cc and 1.5 g/cc. In some aspects, the relationship between the first concentration and the second concentration may be used to achieve a balance between confining sulfur or polysulfides within a respective electrode and maximizing the transport of lithium cations (Lit). For example, sulfur and/or polysulfides may travel through the first concentration and be at least temporarily confined within and/or interspersed throughout the second concentration during operational cycling of a lithium-sulfur battery.

In some implementations, at least some of the carbon structures 756 may include CNO oxides organized as a monolithic and/or interconnected growths and be produced in a thermal reactor. For example, the carbon structures 756 may be decorated with cobalt nanoparticles according to the following example recipe: cobalt(II) acetate ($C_4H_6CoO_4$), the cobalt salt of acetic acid (often found as tetrahydrate $Co(CH_3CO_2)_2 \cdot 4H_2O$, which may be abbreviated as $Co(Oac)_2 \cdot 4H_2O$, may be flowed into the thermal reactor at a ratio of approximately 59.60 wt % corresponding to 40.40 wt % carbon (referring to carbon in CNO form), resulting in the functionalization of active sites on the CNO oxides with cobalt, showing cobalt-decorated CNOs at a 15,000× level, respectively. In some implementations, suitable gas mixtures used to produce Carbon #29 and/or the cobalt-decorated CNOs may include the following steps:

Ar purge 0.75 standard cubic feet per minute (scfm) for 30 min;
Ar purge changed to 0.25 scfm for run;
temperature increase: 25° C. to 300° C. 20 mins; and
temperature increase: 300° C.-500° C. 15 mins.

Carbon materials described with reference to FIGS. 7A and 7B may include or otherwise be formed from one or more instances of graphene, which may include a single layer of carbon atoms with each atom bound to three neighbors in a honeycomb structure. The single layer may be a discrete material restricted in one dimension, such as within or at a surface of a condensed phase. For example, graphene may grow outwardly only in the x and y planes (and not in the z plane). In this way, graphene may be a two-dimensional (2D) material, including one or several layers with the atoms in each layer strongly bonded (such as by a plurality of carbon-carbon bonds) to neighboring atoms in the same layer.

In some implementations, graphene nanoplatelets (e.g., formative structures included in each of the carbon structures 756) may include multiple instances of graphene, such as a first graphene layer, a second graphene layer, and a third graphene layer, all stacked on top of each other in a vertical direction. Each of the graphene nanoplatelets, which may be referred to as a GNP, may have a thickness between 1 nm and 3 nm, and may have lateral dimensions ranging from approximately 100 nm to 100 µm. In some implementations, graphene nanoplatelets may be produced by multiple plasma spray torches arranged sequentially by roll-to-roll ("R2R") production. In some aspects, R2R production may include deposition upon a continuous substrate that is processed as a rolled sheet, including transfer of 2D material(s) to a separate substrate. In some instances, the plasma spray torches used in the described R2R processes may spray carbon materials at different concentration levels to produce specific concentration levels of graphene nanoplatelets. Therefore, R2R processes may provide a fine level of tunability for producing the carbon particles 115 depicted in the micrograph 120 of FIG. 1, the carbon particles 405 depicted in the micrograph 400 of FIG. 4, and/or other carbon particles as described elsewhere in the present disclosure.

Figure 8:
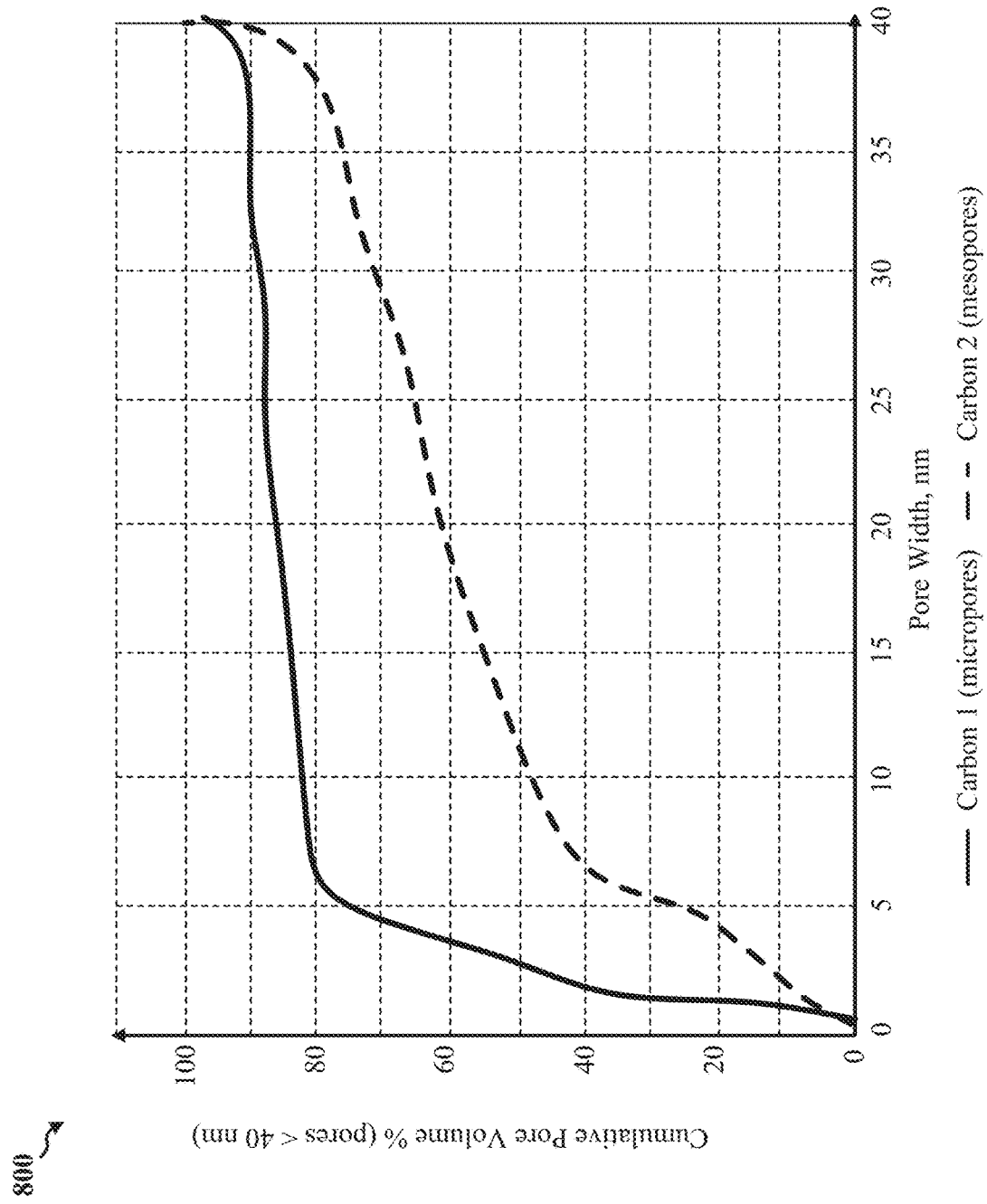
FIG. 8 shows a graph depicting cumulative pore volume versus pore width for micropores and mesopores dispersed throughout example carbon particles, according to some implementations.

FIG. 8 shows a graph 800 depicting cumulative pore volume versus pore width for micropores and mesopores dispersed throughout the carbon particles 405 depicted in the micrograph 400 of FIG. 4, according to some implementations. As used herein, "Carbon 1" refers to structured carbon materials including mostly micropores (such as less than 5 nm in principal dimension), and "Carbon 2" refers to structured carbon materials including mostly mesopores (such as between approximately 20 nm to 50 nm in principal dimension). In some implementations, an electrode suitable for use in one of the batteries disclosed herein may be prepared to have the pore size versus pore distribution depicted in the graph 800.

Figure 9:
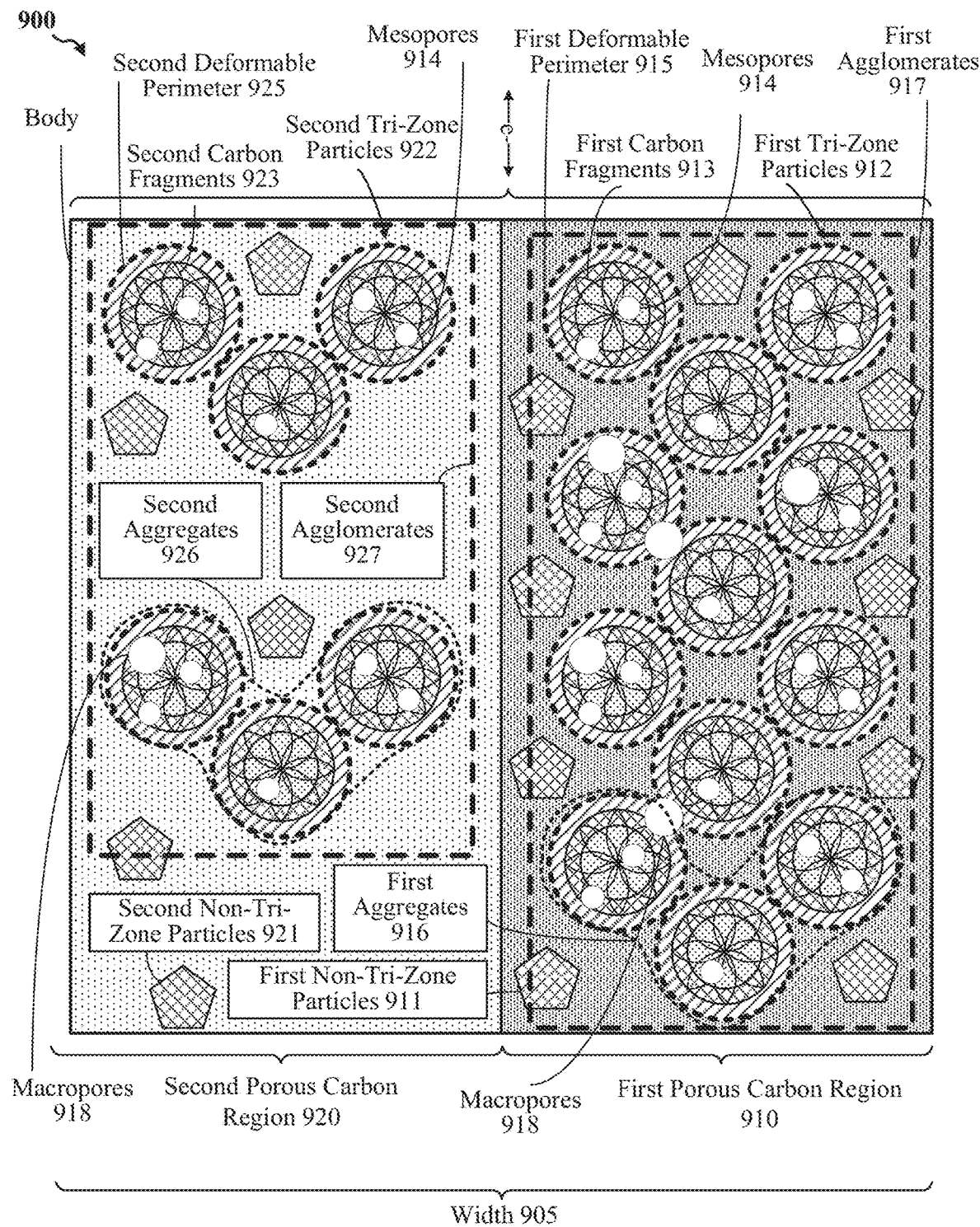
FIG. 9 shows an example configuration of example carbon particles, according to some implementations.

FIG. 9 shows an example configuration 900 of the example carbon particles depicted in FIG. 4, according to some implementations. In some implementations, the configuration 900 may be one example of one or more agglomerates of the carbon particles 115 depicted in the micrograph 120, the first region 117, the second region 118, one or more additional regions 119 of FIG. 1, or other carbon particles described elsewhere in the present disclosure. In one implementation, the configuration 900 includes a first porous carbon region 910 and a second porous carbon region 920 positioned adjacent to the first porous carbon region 910. The first porous carbon region 910 may be formed of a first concentration level of carbon materials, and the second porous carbon region 920 formed of a second concentration level of carbon materials dissimilar to the first concentration level of carbon materials. For example, the second porous carbon region 920 may have a lower concentration level of carbon materials than the first porous carbon region 910 as shown in FIG. 9. In some aspects, additional porous carbon regions (not shown in FIG. 9 for simplicity) maybe coupled with at least the second porous carbon region 920.

Specifically, these additional porous carbon regions may be arranged in order of incrementally decreasing concentration levels of carbon materials in a direction away from the first porous carbon region 910 to provide for complete tunability. That is, in one implementation, the second porous carbon region 920 may face a desired region (e.g., the first region 117 depicted in the micrograph 120 of FIG. 1) and the first porous carbon region 910 of the configuration 900 may be positioned pursuant to customer specifications. In this way, denser carbon regions, such as the first porous carbon region 910, may facilitate relatively low levels of substance (e.g., PPgMA and/or the like) between adjacent contact points of carbon materials, while sparser carbon regions, such as the second porous carbon region 920, may facilitate relatively high levels of substance infiltration. In some implementations, additional carbon regions coupled with and positioned adjacent to the second porous carbon region 920 may have a lower density of carbon materials than the second porous carbon region 920. In this way, the additional carbon regions of lower density may accommodate higher levels of lithium ion transport to, for example, permit for tuning of various performance characteristics of composite materials including the configuration 900.

In one implementation, the first porous carbon region 910 may include first non-tri-zone particles 911. The configuration of the first non-tri-zone particles 911 within the first porous carbon region is one example configuration. Other placements, orientations, alignments and/or the like are possible for the non-tri-zone particles. In some aspects, each non-tri-zone particle may be an example of one or more carbon materials disclosed elsewhere in the present disclosure. The first porous carbon region 910 may also include first tri-zone particles 912 interspersed throughout the first non-tri-zone particles 911 as shown in FIG. 9, or positioned in any other placement, orientation, or configuration. Each first tri-zone particle 912 may be one example of the tri-zone particle 500A of FIG. 5A. In addition, or the alternative, each first tri-zone-particle 912 may include first carbon fragments 913 intertwined with each other and separated from one another by mesopores 914. Each tri-zone-particle may have a first deformable perimeter 915 configured to coalesce with adjacent first non-tri-zone particles 911 and/or first tri-zone particles 912.

The first porous carbon region 910 may also include first aggregates 916, where each aggregate includes a multitude of the first tri-zone particles 912 joined together. In one or more particular examples, each first aggregate may have a principal dimension in a range between 10 nanometers (nm) and 10 micrometers (μm). The mesopores 914 may be interspersed throughout the first plurality of aggregates, where each mesopore has a principal dimension between 3.3 nanometers (nm) and 19.3 nm. In addition, the first porous carbon region 910 may include first agglomerates 917, where each agglomerate includes a multitude of the first aggregates 916 joined to each other. In some aspects, each first agglomerate 917 may have a principal dimension in an approximate range between 0.1 μm and 1,000 μm. Macropores 918 may be interspersed throughout the first aggregates 916, where each macropore may have a principal dimension between 0.1 μm and 1,000 μm. In some implementations, one or more of the above-discussed carbon materials, allotropes and/or structures may be one or more examples of that shown in FIGS. 7A and 7B.

The second porous carbon may include second non-tri-zone particles 921, which may be one example of the first non-tri-zone particles 911. The second porous carbon region 920 may include second tri-zone particles 922, which may each be one example of each of the first tri-zone particles 912 and/or may be one example of the tri-zone particle 500A of FIG. 5A. In addition, or the alternative, each second tri-zone particle 922 may include second carbon fragments 923 intertwined with each other and separated from one another by the mesopores 914. Each second tri-zone particle 922 may have a second deformable perimeter 925 configured to coalesce with one or more adjacent second non-tri-zone particles 921 or second tri-zone particles 922.

In addition, the second porous carbon region 920 may include second aggregates 926, where each second aggregate 926 may include a multitude of the second tri-zone particles 922 joined together. In one or more particular examples, each second aggregate 926 may have a principal dimension in a range between 10 nanometers (nm) and 10 micrometers (μm). The mesopores 914 may be interspersed throughout the second aggregates 926, each mesopore may have a principal dimension between 3.3 nanometers (nm) and 19.3 nm. Further, the second porous carbon region 920 may include second agglomerates 927, each second agglomerate 927 may include a multitude of the second aggregates 926 joined to each other, where each agglomerate may have a principal dimension in an approximate range between 0.1 μm and 1,000 μm. The macropores 918 may be interspersed throughout the second plurality of aggregates, where each macropore having a principal dimension between 0.1 μm and 1,000 μm. In some implementations, one or more of the above-discussed carbon materials, allotropes and/or structures may be one or more examples of that shown in FIGS. 9A and 9B.

In one implementation, the first porous carbon region 910 and/or the second porous carbon region 920 may include a selectively permeable shell (not shown in FIG. 9 for simplicity), which may form a separated liquid phase on the first porous carbon region 910 or the second porous carbon region 920, respectively. An electrolyte, such as any of the electrolytes disclosed in the present disclosure, may be dispersed within the first porous carbon region and/or the second porous carbon region for lithium ion transport associated with lithium-sulfur battery discharge-charge operational cycling.

In one or more particular examples, the first porous carbon region 910 may have an electrical conductivity in an approximate range between 500 S/m to 20,000 S/m at a pressure of 12,000 pounds per square in (psi). The second porous carbon region 920 may have an electrical conductivity in an approximate range between 0 S/m to 500 S/m at a pressure of 12,000 pounds per square in (psi). The first agglomerates 917 and/or second agglomerates 927 may include aggregates connected to each other with one or more polymer-based binders.

In some aspects, each first tri-zone particle 912 may have a first porosity region (not shown in FIG. 9 for simplicity) located around a center of the first tri-zone particle 912. Similarly, each second tri-zone 922 may have a first porosity region (not shown in FIG. 9 for simplicity) located around a center of the second tri-zone particle 922. The first porosity region may include first pores. A second porosity region (not shown in FIG. 9 for simplicity) may surround the first porosity region. The second porosity region may include second pores. In one implementation, the first pores may define a first pore density, and the second pores may define a second pore density that is different the first pore density.

In some aspects, the mesopores 914 may be grouped into first mesopores and second mesopores (both not shown in FIG. 9 for simplicity). In one or more particular examples, the first mesopores may have a first mesopore density, and the second mesopores may have a second mesopore density that is different than the first mesopore density. In addition, the macropores 918 may be grouped into first macropores that may have a first pore density, and second macropores (both not shown in FIG. 9 for simplicity) that may have a second pore density different than the first pore density.

Figure 10:
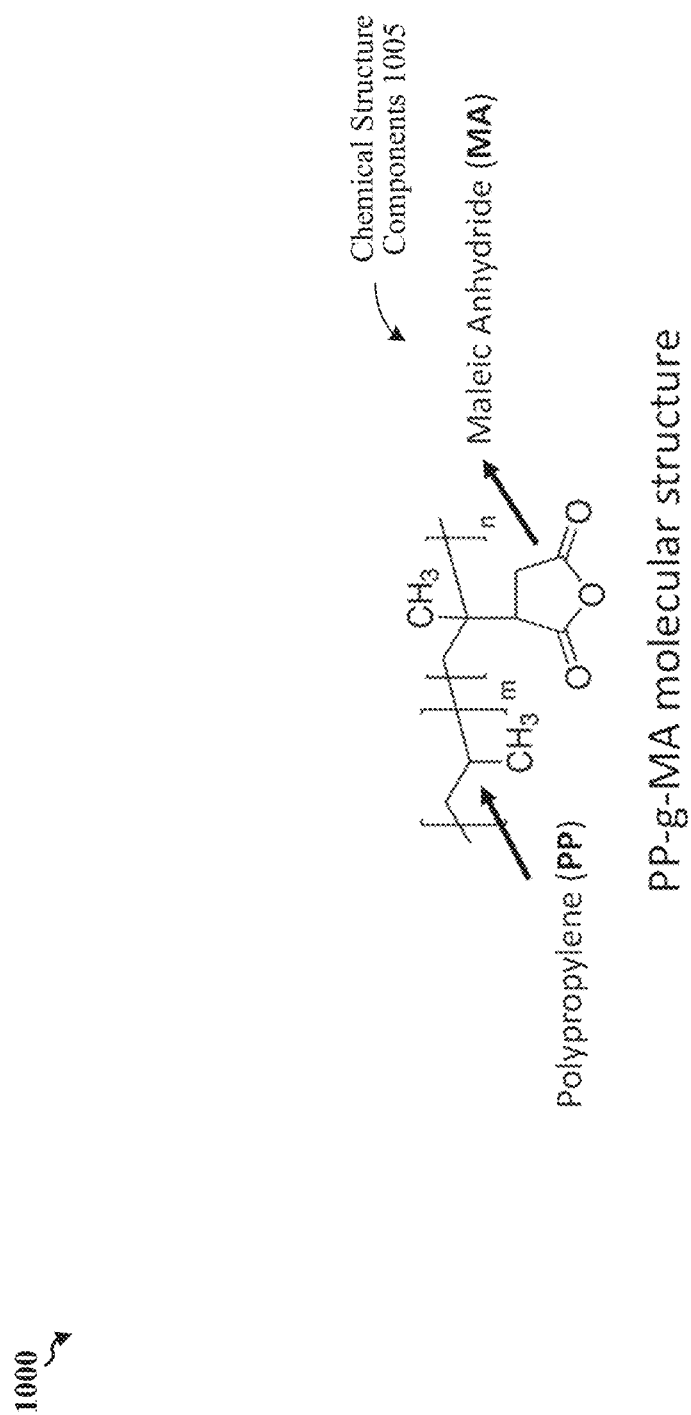
FIG. 10 shows a diagram of the chemical structure of polypropylene-graft-maleic anhydride (PPgMA), according to some implementations.

FIG. 10 shows a diagram 1000 of chemical structure components 1005 of polypropylene-graft-maleic anhydride (PPgMA), according to some implementations. PPgMA is a 2-component molecule, including polypropylene (PP) and maleic anhydride (MA). In some aspects, PPgMA may be provided in the form of beads and have a number-averaged molecular weight ($M_n$) of approximately 3,900 and a weight-averaged molecular weight ($M_w$) of approximately 9,100 as determined by gel permeation chromatography (GPC). Typical composite material compositions may include loading levels of approximately 8 wt. %-10 wt. % of MW with the balance of PP. In some instances, the measured viscosity of PPgMA may be approximately 4.0 poise at a temperature of approximately 190° C. PPgMA may have a melting point (mp) of approximately 156° C. and an approximate density of 0.934 $g/mL$ at 25° C.

Figure 11:
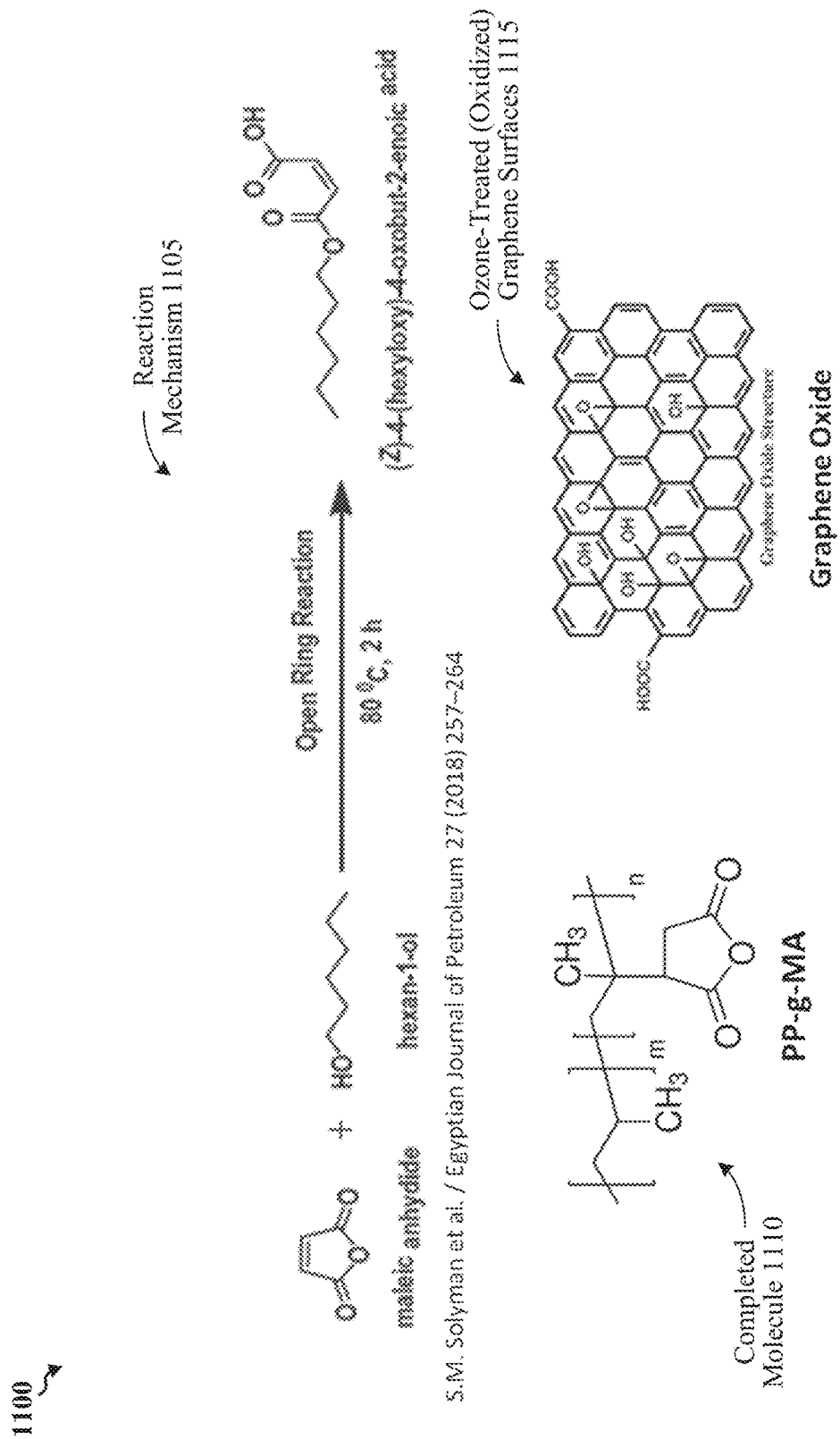
FIG. 11 shows an example chemical reaction mechanism for producing PPgMA and for ozone-treating graphene surfaces, according to some implementations.

FIG. 11 shows example chemical structures 1100 including a chemical reaction mechanism 1105 for producing the PPgMA depicted in FIG. 10 and for ozone-treating graphene surfaces, according to some implementations. For example, as shown by the chemical reaction mechanism 1105, MA may behave as a reactive group and react with one or more other chemical substances (e.g., hexan-1-ol) via an open ring reaction, which may produce one or more intermediary products that undergo one or more additional chemical reactions to produce a completed molecule 1110. In some aspects, the completed molecule 1110 may chemically react with other instances of the completed molecule 1110 to produce PPgMA for incorporation in the composite material of FIG. 1.

In some implementations, the composite material of FIG. 1 may incorporate at least some of the carbon particles 115.

In some aspects, the carbon particles 115 have exposed carbon surfaces (e.g., ozone-treaded (oxidized) graphene surfaces 1115) and carbon atoms bonded to molecular sites on adjacent PPgMA molecules. At least some of the carbon atoms may be oxidized with one or more oxygen-containing groups. By oxidating the carbon atoms, more PPgMA molecules may chemically bond with adjacent carbon atoms per unit volume. In this way, interaction between carbon atoms and PPgMA molecules may maintain composite material density within $^+/_-$ 3% of thermoplastic resin density and have a predictable rheological profile (such as with viscosity levels between 2,100 pascal-seconds (Pa·S) and approximately 700 Pa·S).

Figure 12:
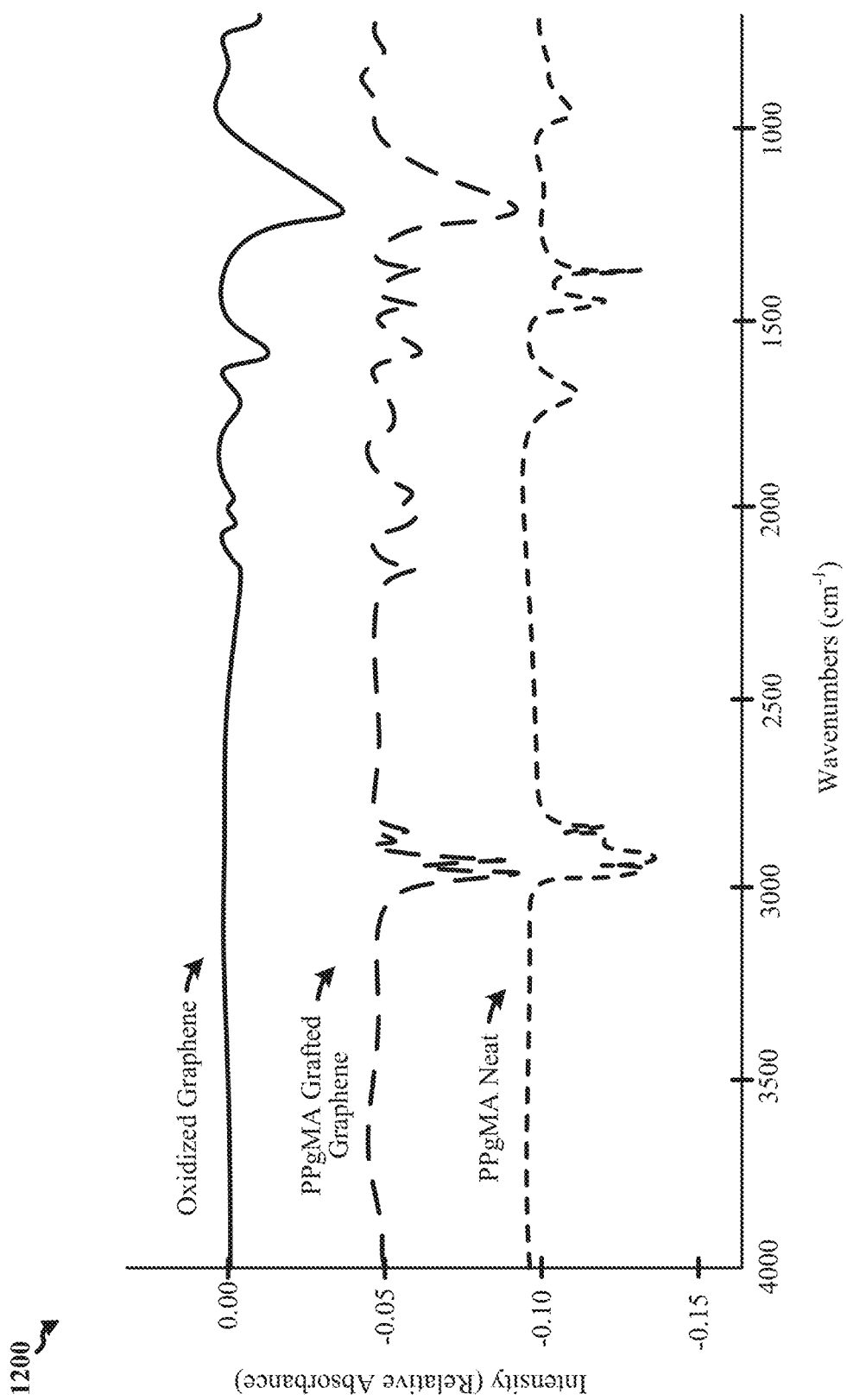
FIG. 12 shows a graph depicting intensity (relative absorbance) per wavenumber ($cm^{-1}$), according to some implementations.

FIG. 12 shows a graph 1200 depicting intensity (relative absorbance) per wavenumber ($cm^{-1}$), according to some implementations. The graph 1200 indicates example observed properties of the composite material of FIG. 1. As depicted in the graph 1200, each of oxidized graphene, PPgMA grafted graphene, and neat PPgMA have a different intensity.

Figure 13:
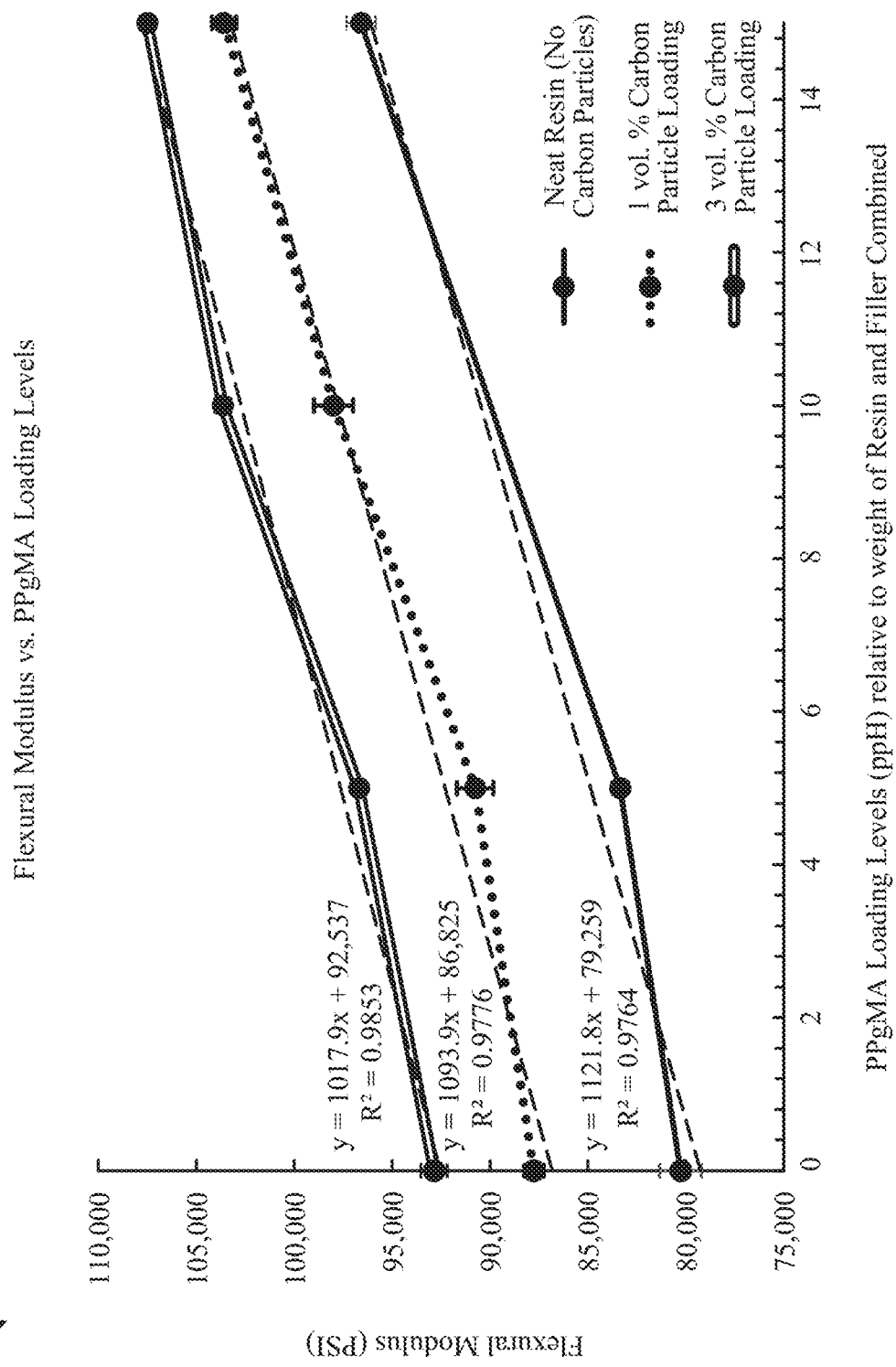
FIG. 13 shows a graph depicting flexural modulus (pounds per square inch, PSI) per PPgMA loading levels (ppH) relative to weight of resin and filler combined of the example composite materials, according to some implementations.

FIG. 13 shows a graph 1300 depicting flexural modulus (PSI) per PPgMA loading levels (ppH) relative to weight of resin and filler combined of the example composite materials of FIG. 1, according to some implementations. The graph 1300 indicates example observed properties of the composite material of FIG. 1. As depicted in the graph 1300, each of neat resin (e.g., thermoplastic resin without any carbon loading levels), 1 volume (vol.) % carbon particle loading, and 3 vol. % carbon particle loading has a distinct flexural modulus (PSI) profile per PPgMA loading levels (ppH) relative to weight of resin and filler combined.

Figure 14:
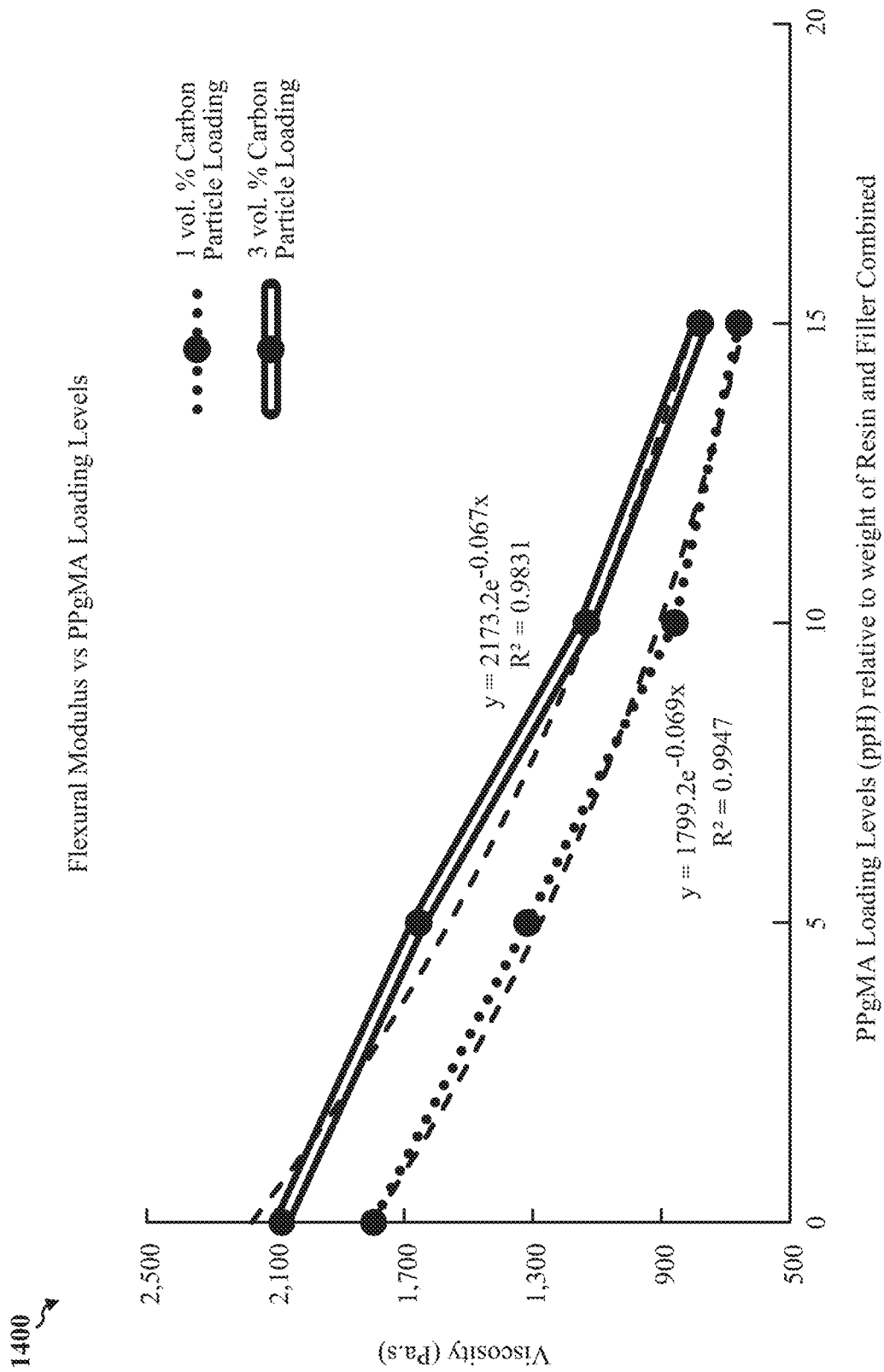
FIG. 14 shows a graph depicting viscosity (Pass) per PPgMA loading levels (parts per hundred, ppH) relative to weight of resin and filler combined for example composite materials, according to some implementations.

FIG. 14 shows a graph 1400 depicting viscosity (Pass) per PPgMA loading levels (parts per hundred, ppH) relative to weight of resin and filler combined of the example composite materials of FIG. 1, according to some implementations. The graph 1400 indicates example observed properties of the composite material of FIG. 1. As depicted in the graph 1400, each of 1 volume (vol.) % carbon particle loading and 3 vol. % carbon particle loading has a distinct viscosity (Pass) per PPgMA loading level (ppH) relative to weight of resin and filler combined.

Figure 15:
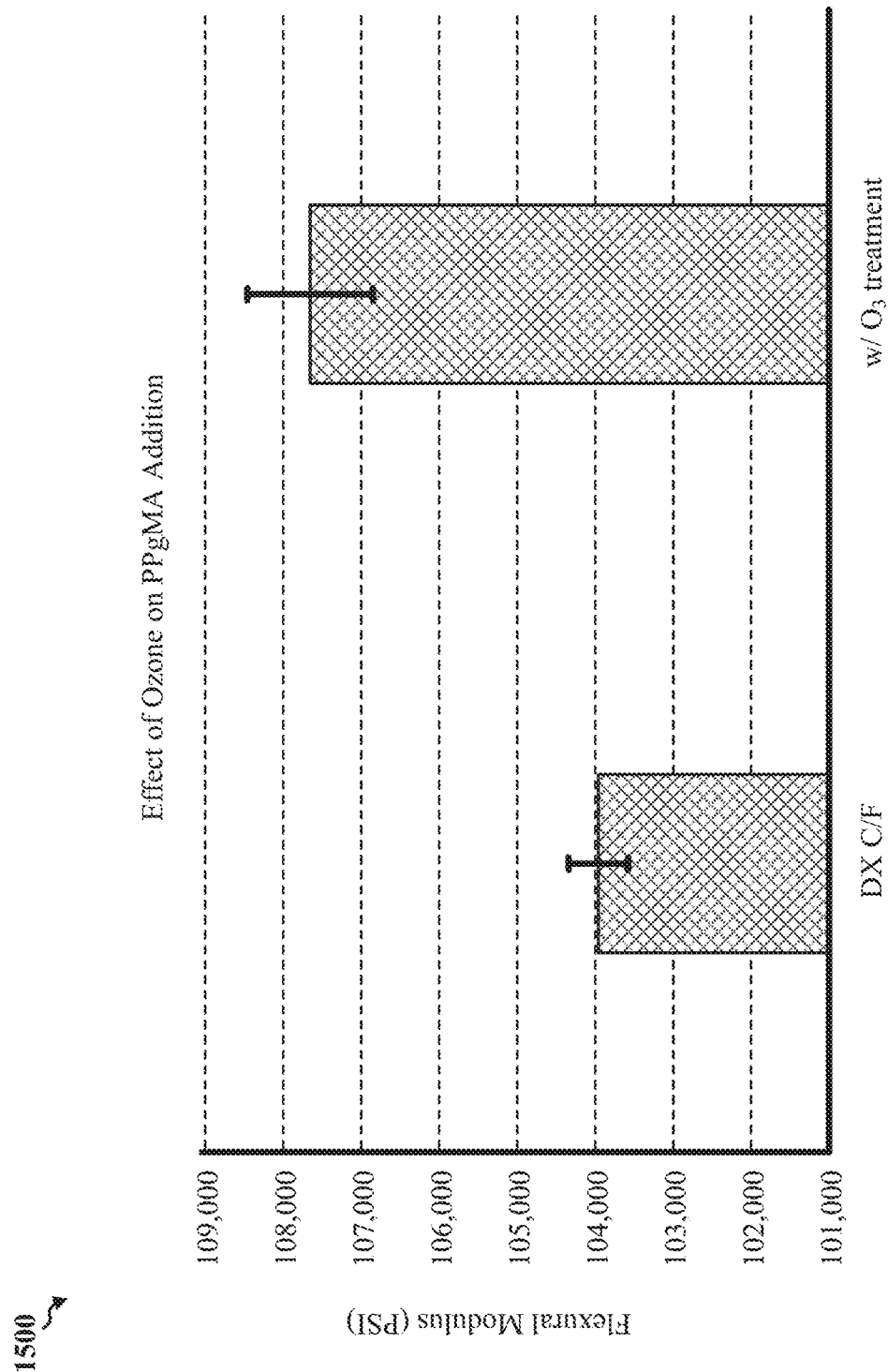
FIG. 15 shows a bar chart depicting flexural modulus (PSI) of non-oxidized carbon materials (DX C/F) and ozone ($O_3$)-treated carbon particles for example composite materials, according to some implementations.

FIG. 15 shows a bar chart 1500 depicting flexural modulus (PSI) of non-oxidized carbon materials (DX C/F) and ozone ($O_3$)-treated carbon particles for the example composite materials of FIG. 1, according to some implementations. The bar chart 1500 indicates example observed properties of the composite material of FIG. 1.

Figure 16:
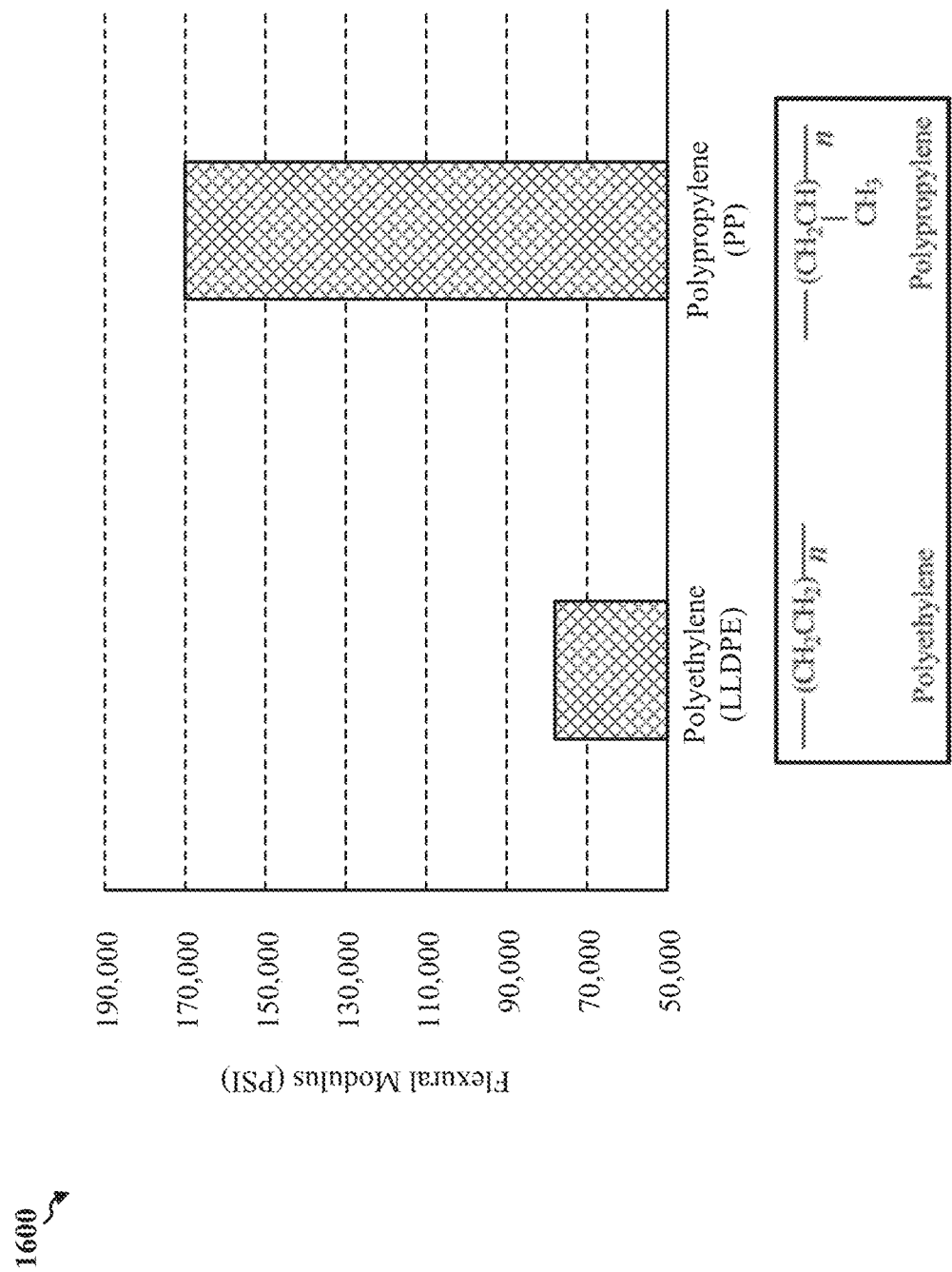
FIG. 16 shows a bar chart depicting flexural modulus (PSI) of linear low-density polyethylene (LLDPE) and polypropylene (PP) for example composite materials, according to some implementations.

FIG. 16 shows a bar chart 1600 depicting flexural modulus (PSI) of linear low-density polyethylene (LLDPE) and polypropylene (PP) for the example composite materials of FIG. 1, according to some implementations. The bar chart 1600 indicates example observed properties of the composite material of FIG. 1. As depicted in the bar chart 1600, PP has a higher PSI than LLDPE. Blending of the LLDPE and PP may increase their reinforcement of, for example, the carbon particles 115 of FIG. 1. In some instances, a combination of the LLDPE and PP may be infiltrated into open porous regions of the carbon particles 115 (and/or as described with respect to the configuration 900 of FIG. 9) to enhance the physical properties of the composite material.

Figure 17:
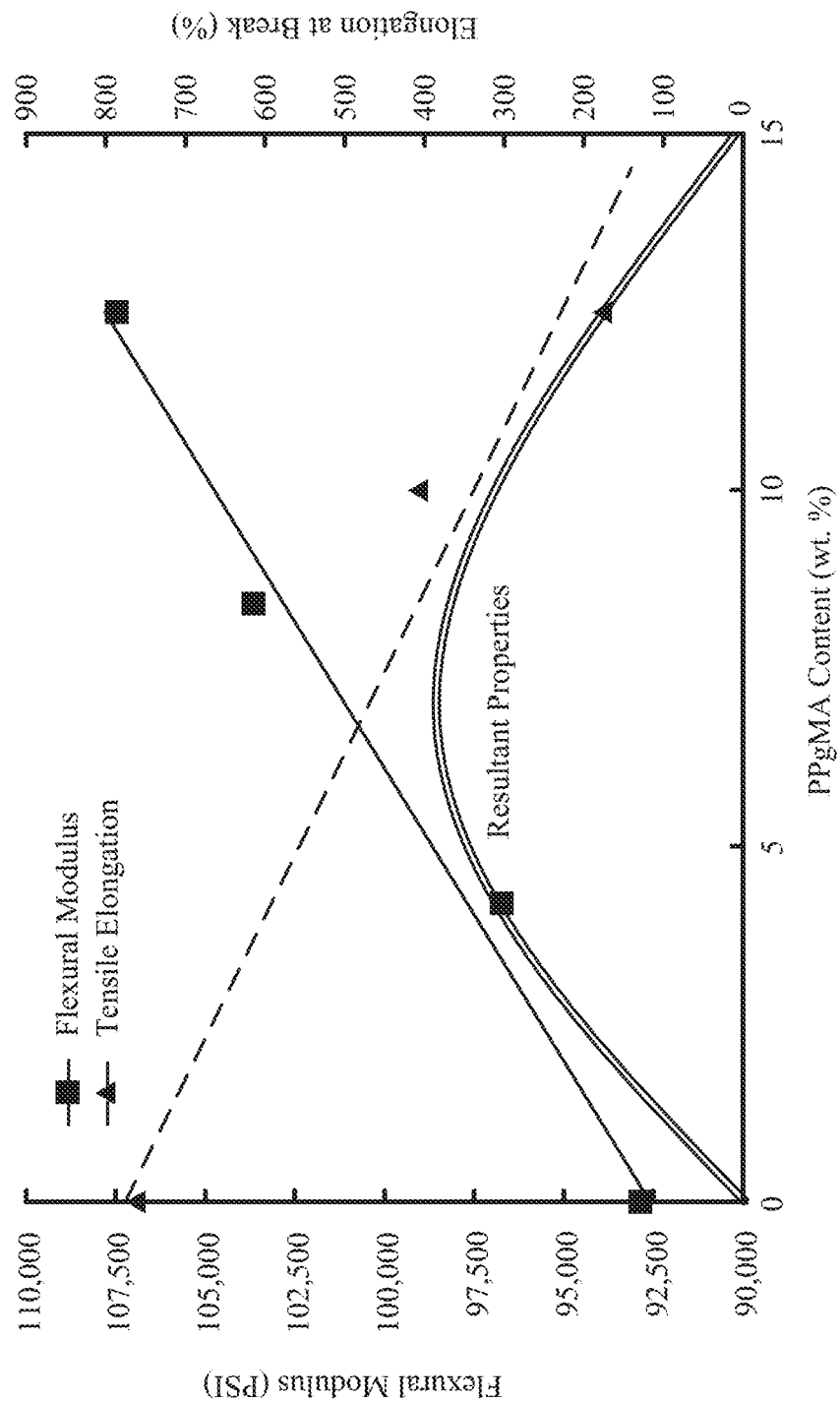
FIG. 17 shows a graph depicting flexural modulus (PSI) and elongation at break (%) per PPgMA loading levels (ppH) relative to weight of resin and filler combined for example composite materials, according to some implementations.

FIG. 17 shows a graph 1700 depicting flexural modulus (PSI) and elongation at break (%) per PPgMA loading levels (ppH) relative to weight of resin and filler combined of the example composite materials of FIG. 1, according to some implementations. The graph 1700 indicates example observed properties of the composite material of FIG. 1.

Figure 18:
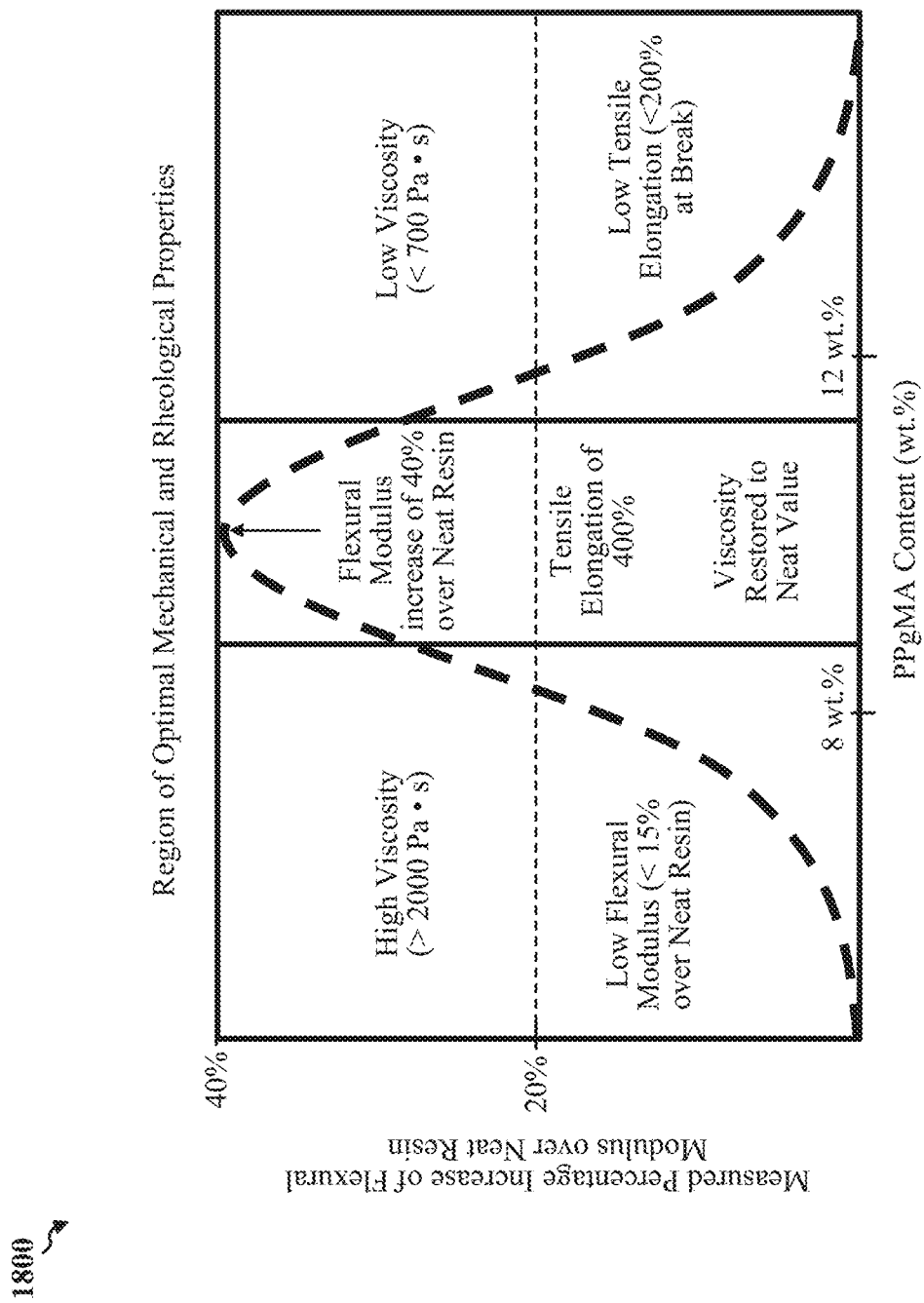
FIG. 18 shows a graph of measured percentage (%) increase of flexural modulus over neat resin per PPgMA loading levels (ppH) relative to weight of resin and filler combined for example composite materials, according to some implementations.

FIG. 18 shows a graph 1800 of measured percentage (%) increase of flexural modulus over neat resin per PPgMA loading levels (ppH) relative to weight of resin and filler combined of the example composite materials of FIG. 1, according to some implementations. The graph 1800 indicates example observed properties of the composite material of FIG. 1.

Figure 19:
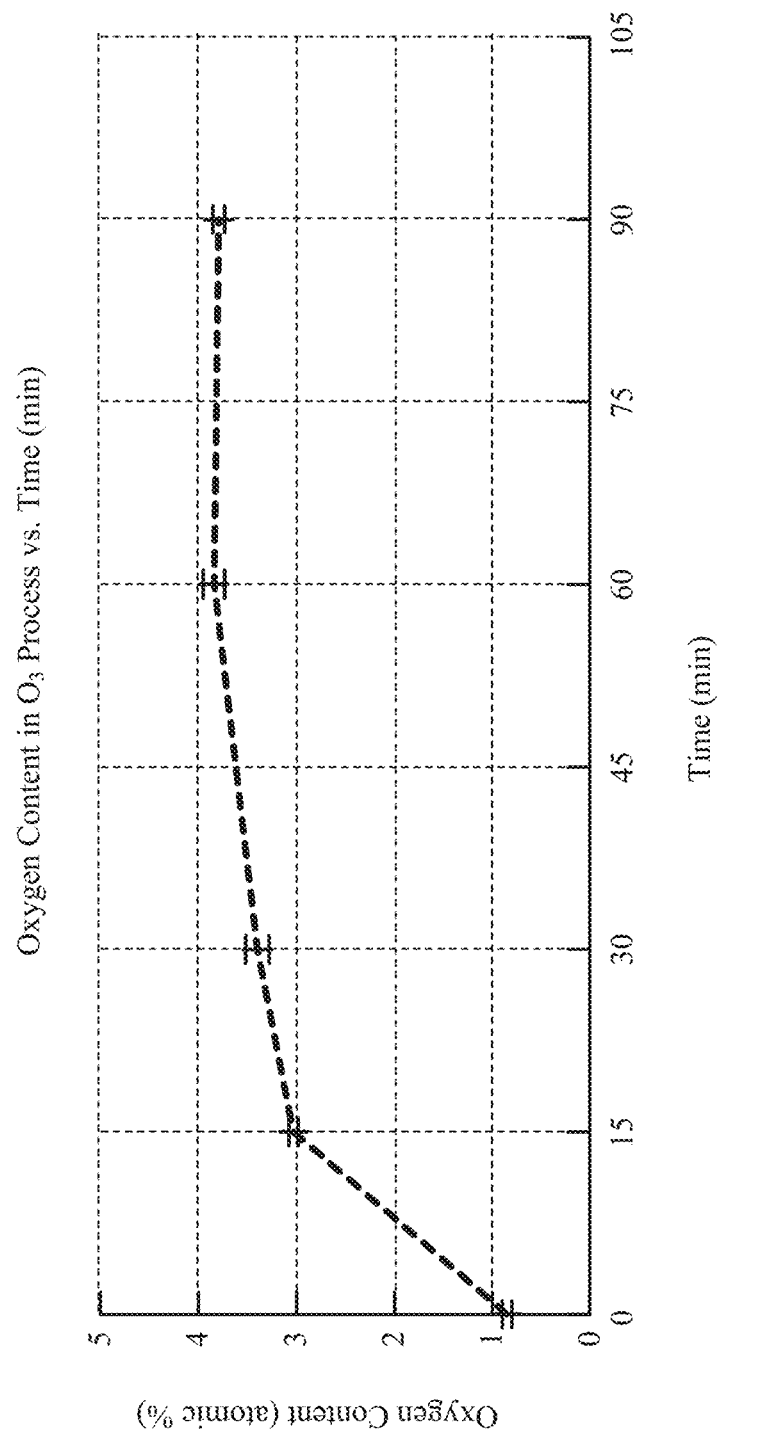
FIG. 19 shows a graph of oxygen content (atomic (at.) %) in ozone ($O_3$) treatment processes per time (minutes (min.)) of ozone-treating of example composite materials, according to some implementations.

FIG. 19 shows a graph 1900 of oxygen content (atomic (at.) %) in ozone ($O_3$) treatment processes per time (minutes (min.)) of ozone-treating of the example composite materials of FIG. 1, according to some implementations. The graph 1900 indicates example properties of the composite material of FIG. 1 observed during ozone-treatment (e.g., oxidation of carbon atoms provided by exposed carbon surfaces).

Figure 20:
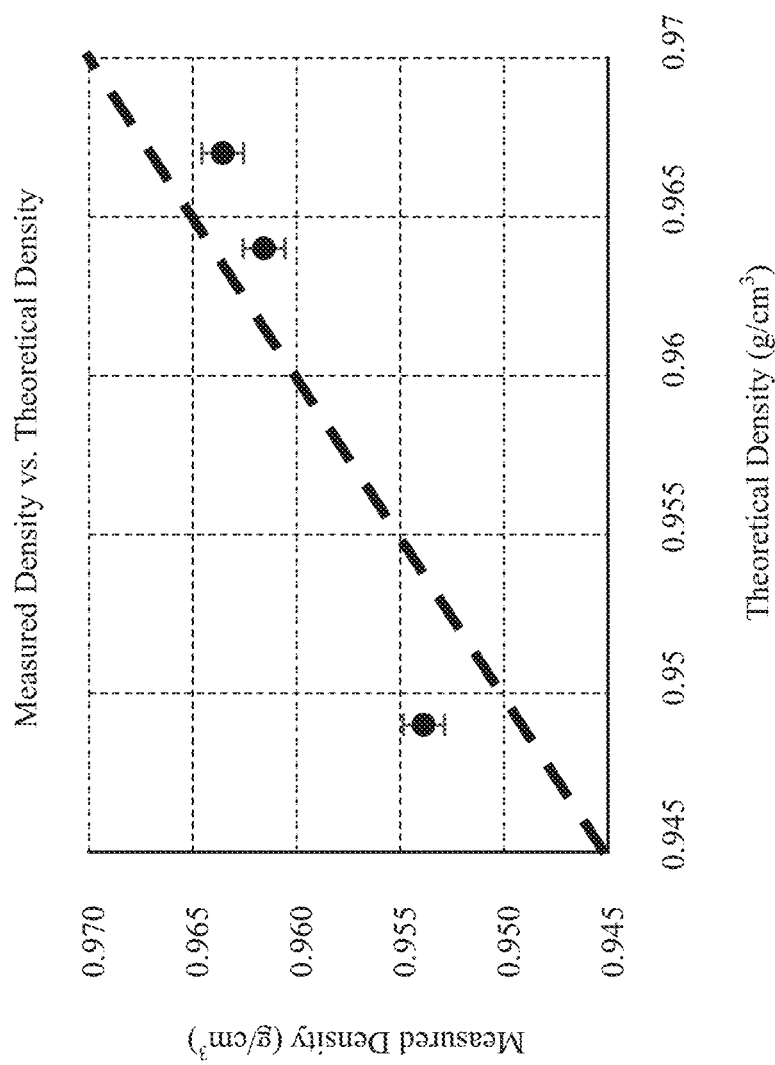
FIG. 20 shows a graph of measured density ($g/cm^3$) versus theoretical density ($g/cm^3$) of example composite materials, according to some implementations.

FIG. 20 shows a graph 2000 of measured density ($g/cm^3$) versus theoretical density ($g/cm^3$) of the example composite materials of FIG. 1, according to some implementations. The graph 2000 indicates example observed properties of the composite material of FIG. 1.

Figure 21:
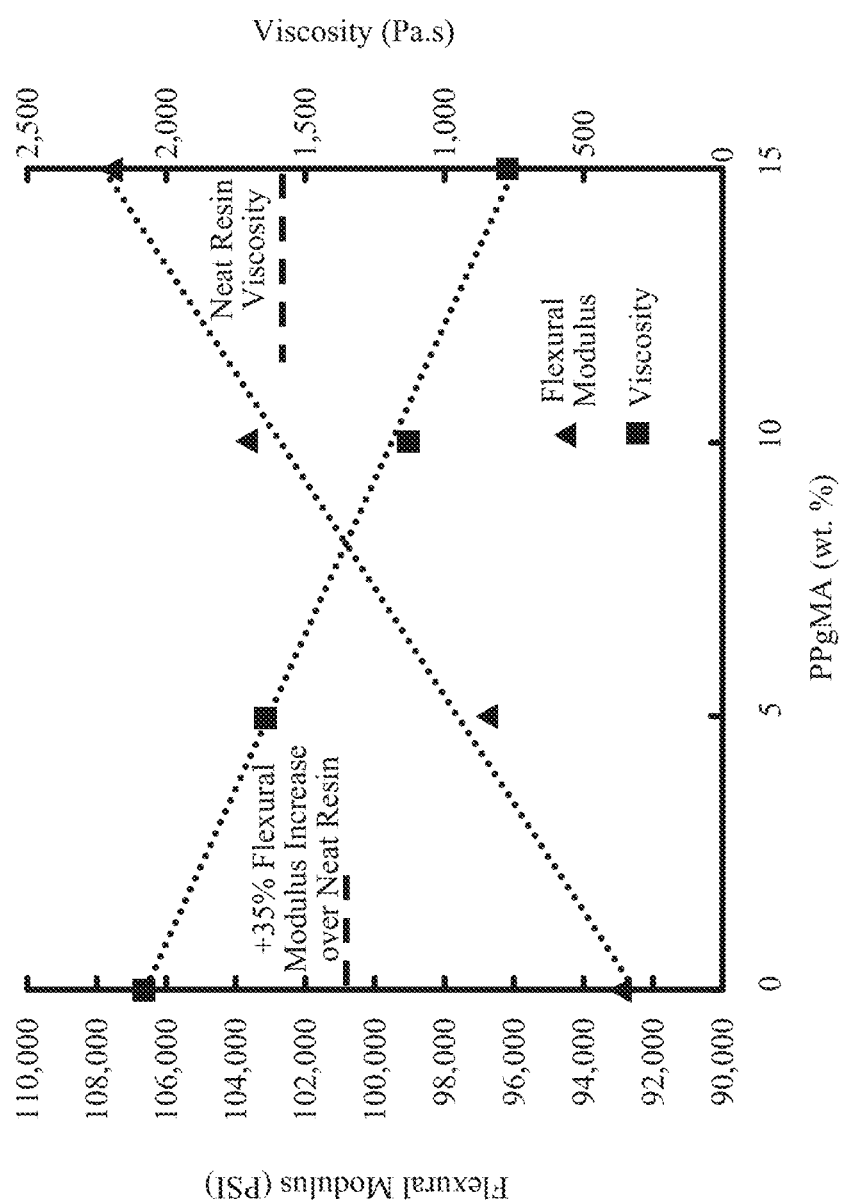
FIG. 21 shows a graph of flexural modulus (PSI) and viscosity (Pass) per PPgMA loading levels (ppH) relative to weight of resin and filler combined for example composite materials, according to some implementations.

FIG. 21 shows a graph 2100 of flexural modulus (PSI) and viscosity (Pass) per PPgMA loading levels (ppH) relative to weight of resin and filler combined of the example composite materials of FIG. 1, according to some implementations. The graph 2100 indicates example observed properties of the composite material of FIG. 1.

Figure 22:
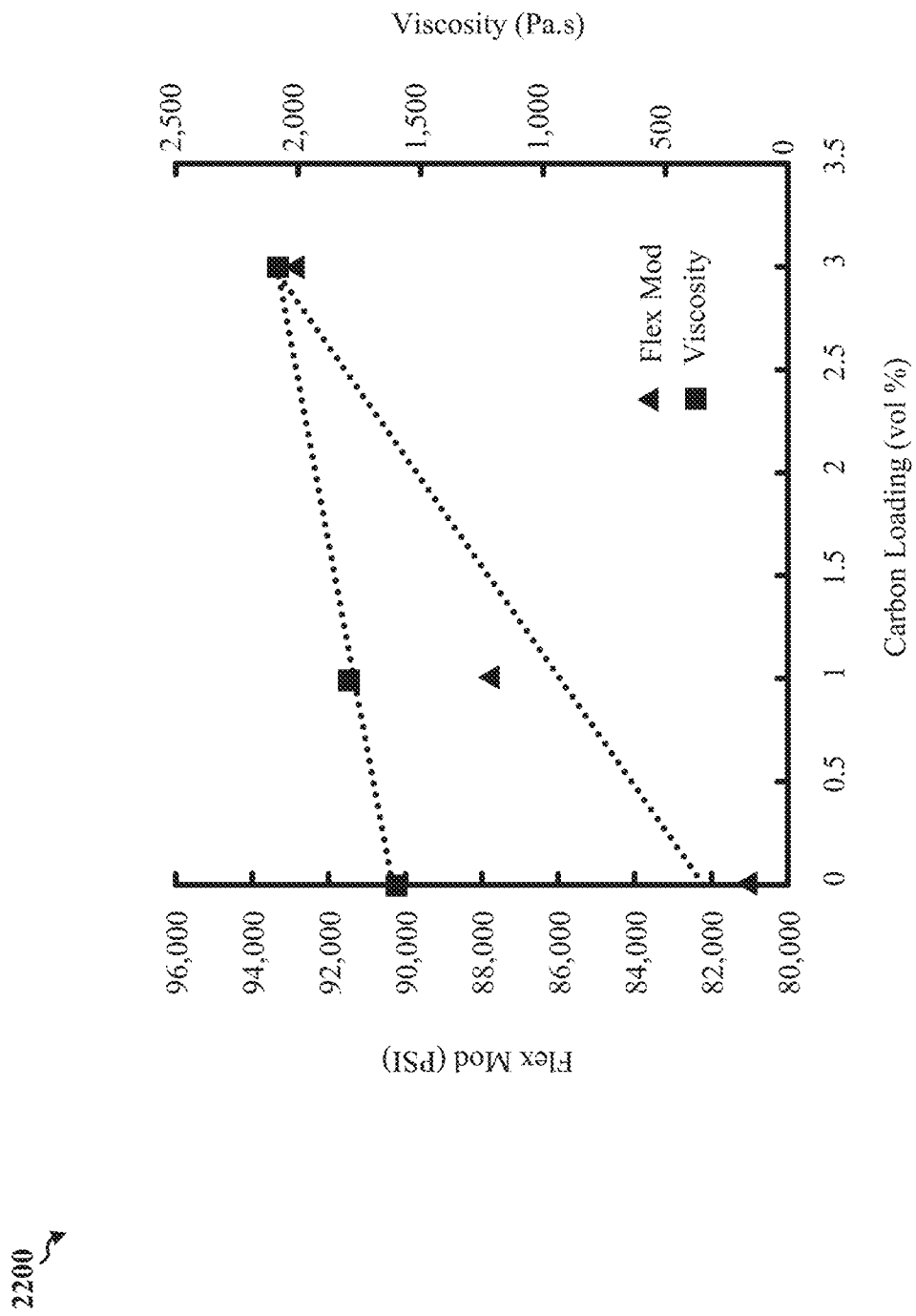
FIG. 22 shows a graph of flexural modulus (PSI) and viscosity (Pass) carbon loading (volume (vol.) %) of example composite materials, according to some implementations.

FIG. 22 shows a graph 2200 of flexural modulus (PSI) and viscosity (Pa·s) carbon loading (volume (vol.) %) of the example composite materials of FIG. 1, according to some implementations. The graph 2200 indicates example observed properties of the composite material of FIG. 1.

Figure 23:
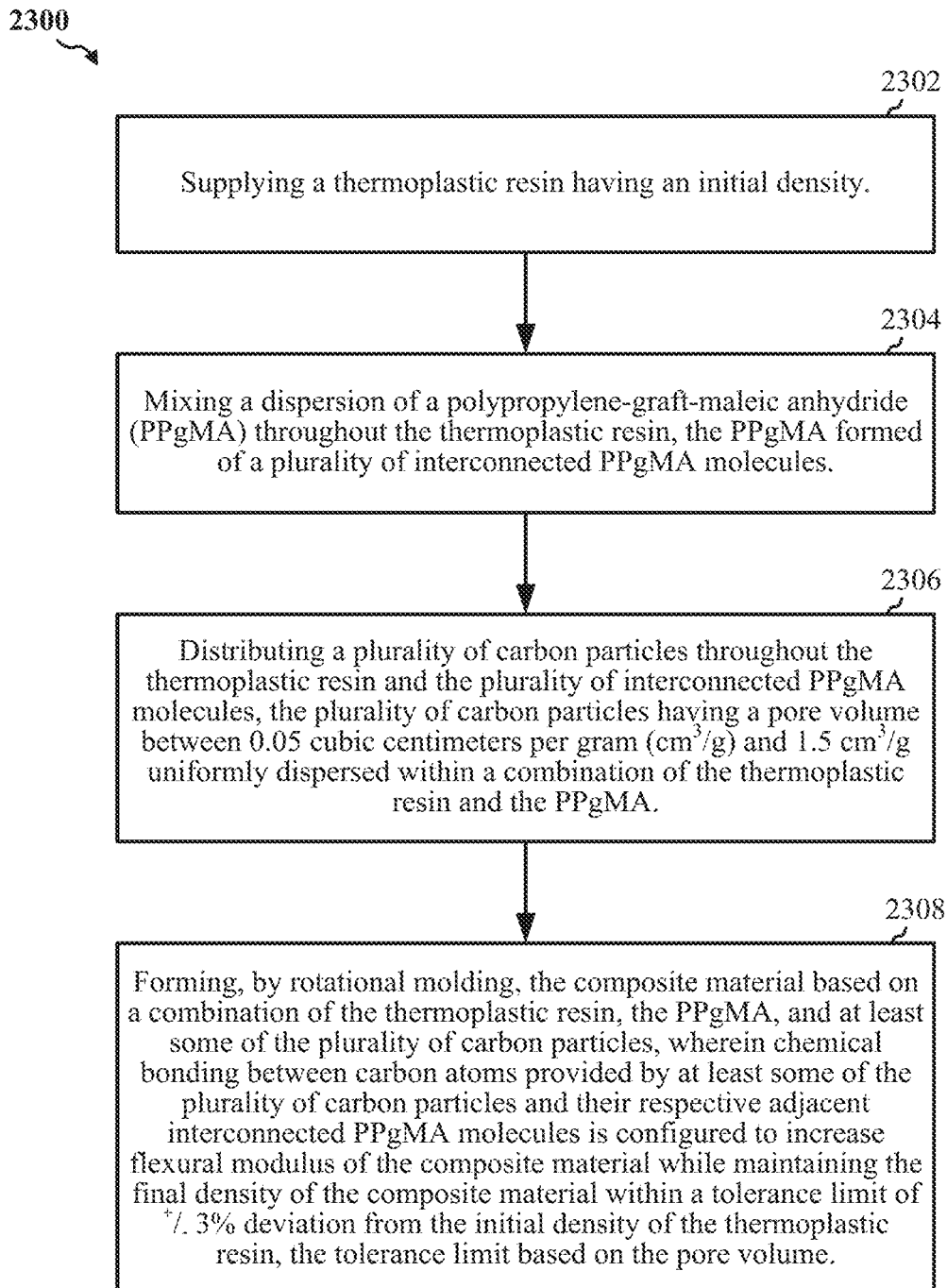
FIG. 23 shows a flowchart depicting an example operation for producing composite materials, according to some implementations.

FIG. 23 shows a flowchart depicting an example operation 2300 for producing composite materials depicted in the micrographs 120 of FIG. 1, according to some implementations. In various implementations, the operation 2300 may be performed in one or more reactors, and the one or more reactors may include a thermal reactor chamber, a plasma reactor, a spray dryer, an atomizer, or any other suitable chemical processing apparatus. In some aspects, the operation 2300 begins at block 2302 with supplying a thermoplastic resin having an initial density. The operation continues at block 2304 with mixing a dispersion of a polypropylene-graft-maleic anhydride (PPgMA) throughout the thermoplastic resin, the PPgMA formed of a plurality of interconnected PPgMA molecules. The operation continues at block 2306 with distributing a plurality of carbon particles throughout the thermoplastic resin and the plurality of interconnected PPgMA molecules, the plurality of carbon particles having a pore volume between 0.05 cubic centimeters per gram ($cm^3/g$) and 1.5 $cm^3/g$ uniformly dispersed within a combination of the thermoplastic resin and the PPgMA. The operation continues at block 2308 with forming, by rotational molding, the composite material based on a combination of the thermoplastic resin, the PPgMA, and at least some of the plurality of carbon particles, where chemical bonding between carbon atoms provided by at least some of the plurality of carbon particles and their respective adjacent interconnected PPgMA molecules is configured to increase flexural modulus of the composite material while maintaining the final density of the composite material within a tolerance limit of +/−3% deviation from the initial density of the thermoplastic resin, where the tolerance limit is based on the pore volume.

Figure 24:
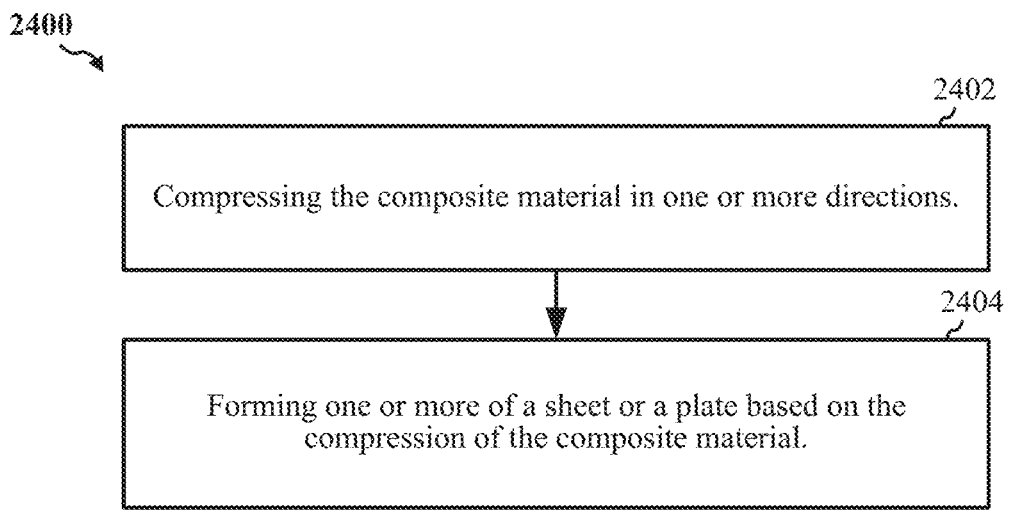
FIG. 24 shows a flowchart depicting an example operation for forming composite materials, according to some implementations.

FIG. 24 shows a flowchart depicting an example operation 2400 for forming the composite materials produced in FIG. 23, according to some implementations. In various implementations, the operation 2400 may be performed in a mold and/or molding apparatus. In some aspects, the operation 2400 begins at block 2402 with compressing the composite material in one or more directions. The operation continues at block 2404 with forming one or more of a sheet or a plate based on the compression of the composite material.

Figure 25:
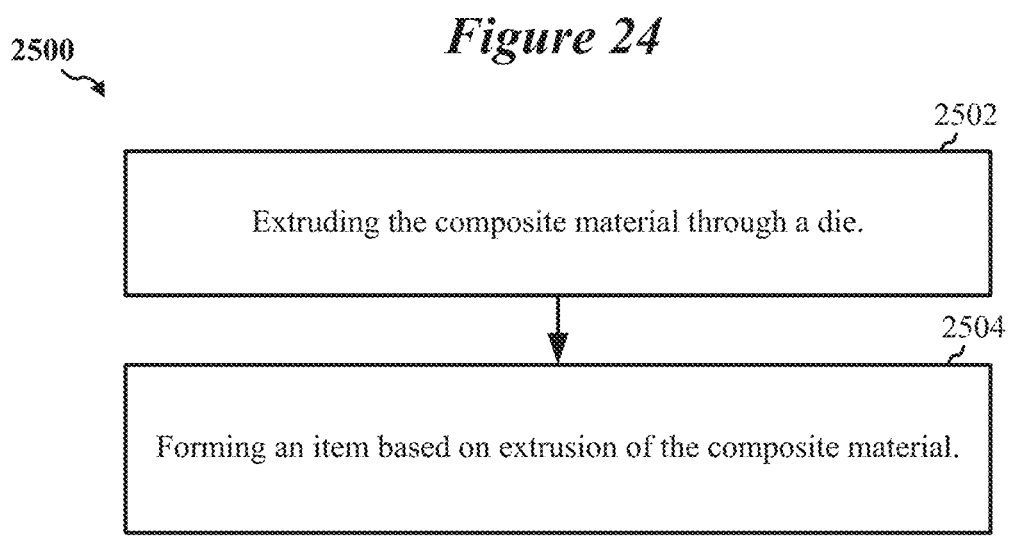
FIG. 25 shows a flowchart depicting an example operation for extruding composite material, according to some implementations.

FIG. 25 shows a flowchart depicting an example operation 2500 for extruding the composite material produced in FIG. 23, according to some implementations. In various implementations, the operation 2500 may be performed in a material extruder. In some aspects, the operation 2500 begins at block 2502 with extruding the composite material through a die. The operation continues at block 2504 with forming an item based on extrusion of the composite material.

Figure 26:
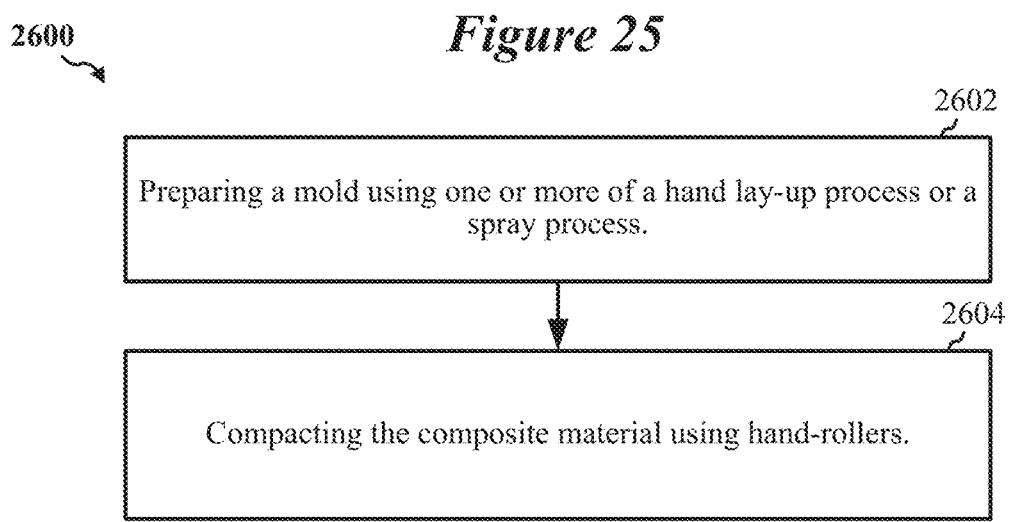
FIG. 26 shows a flowchart depicting an example operation for compacting composite material, according to some implementations.

FIG. 26 shows a flowchart depicting an example operation 2600 for compacting the composite material produced in FIG. 23, according to some implementations. In various implementations, the operation 2600 may be performed in a mold. In some aspects, the operation 2600 begins at block 2602 with preparing a mold using one or more of a hand lay-up process or a spray process. The operation continues at block 2604 with compacting the composite material using hand-rollers.

Figure 27:
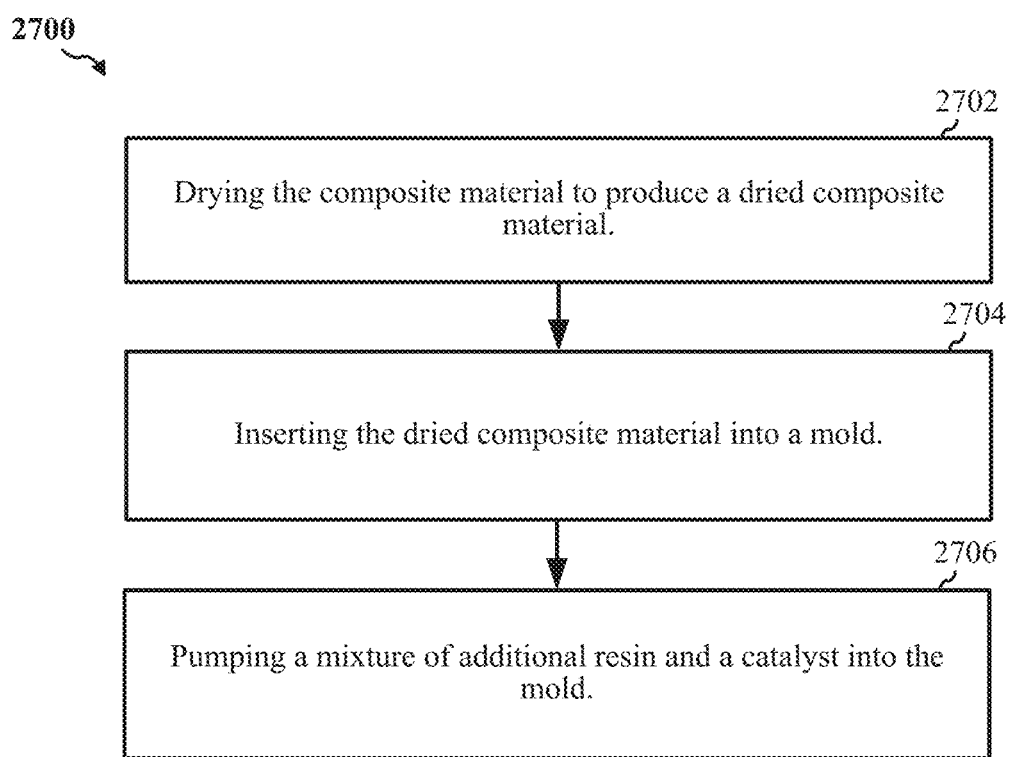
FIG. 27 shows a flowchart depicting an example operation for pumping a mixture of additional resin and a catalyst into a mold, according to some implementations.

FIG. 27 shows a flowchart depicting an example operation 2700 for pumping a mixture of additional resin and a catalyst into a mold used for forming the composite material produced in FIG. 23, according to some implementations. In various implementations, the operation 2700 may be performed in a mold. In some aspects, the operation 2700 begins at block 2702 with drying the composite material to produce a dried composite material. The operation continues at block 2704 with inserting the dried composite material into a mold. The operation continues at block 2706 with pumping a mixture of additional resin and a catalyst into the mold.

Figure 28:
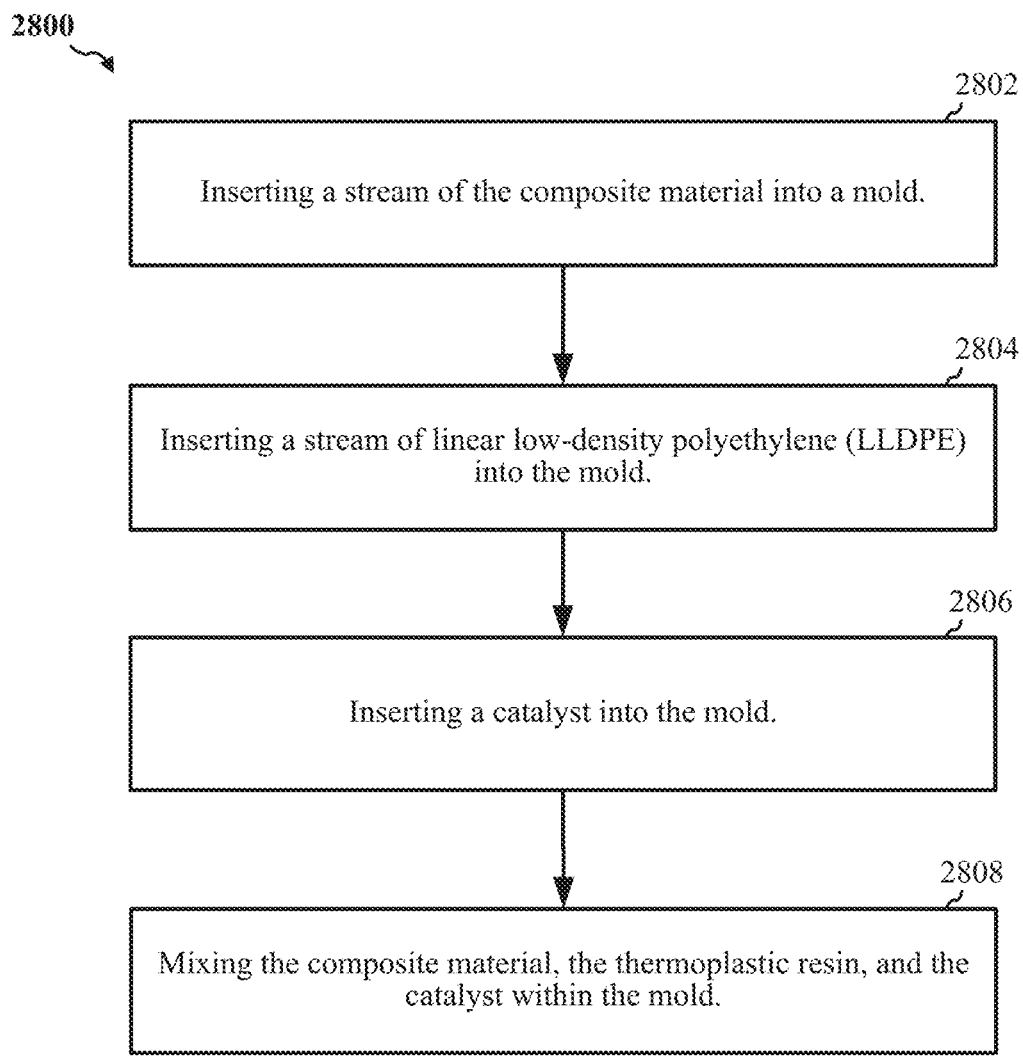
FIG. 28 shows a flowchart depicting an example operation for inserting a stream of composite material into a mold, according to some implementations.

FIG. 28 shows a flowchart depicting an example operation 2800 for inserting a stream of the composite material produced in FIG. 23 into a mold, according to some implementations. In various implementations, the operation 2800 may be performed in a mold. In some aspects, the operation 2800 begins at block 2802 with inserting a stream of the composite material into a mold. The operation continues at block 2804 with inserting a stream of linear low-density polyethylene (LLDPE) into the mold. The operation continues at block 2806 with inserting a catalyst into the mold. The operation continues at block 2808 with mixing the composite material, the thermoplastic resin, and the catalyst within the mold.

Figure 29:
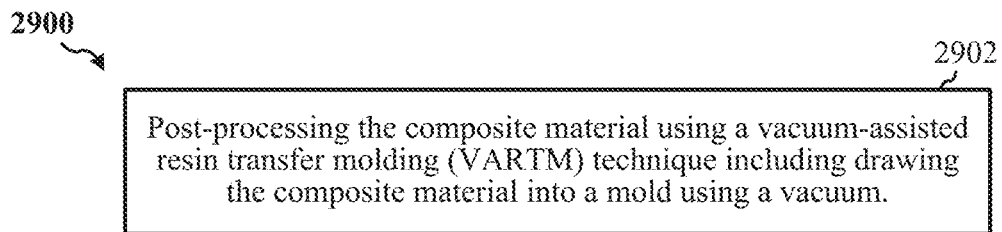
FIG. 29 shows a flowchart depicting an example operation for post-processing composite material, according to some implementations.

FIG. 29 shows a flowchart depicting an example operation 2900 for post-processing the composite material produced in FIG. 23, according to some implementations. In various implementations, the operation 2800 may be performed in a vacuum-assisted resin transfer molding (VARTM) apparatus. In some aspects, the operation 2900 begins at block 2902 with post-processing the composite material using a vacuum-assisted resin transfer molding (VARTM) technique including drawing the composite material into a mold using a vacuum.

Figure 30:
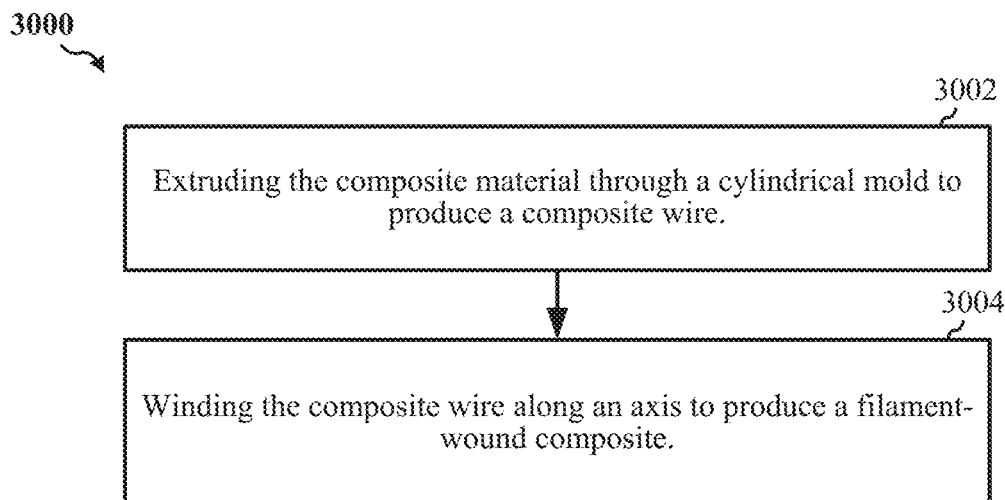
FIG. 30 shows a flowchart depicting an example operation for extruding composite material through a cylindrical mold, according to some implementations.

FIG. 30 shows a flowchart depicting an example operation 3000 for extruding the composite material through a cylindrical mold, according to some implementations. In various implementations, the operation 3000 may be performed in a mold. In some aspects, the operation 3000 begins at block 3002 with extruding the composite material through a cylindrical mold to produce a composite wire. The operation continues at block 3004 with winding the composite wire along an axis to produce a filament-wound composite.

Figure 31:
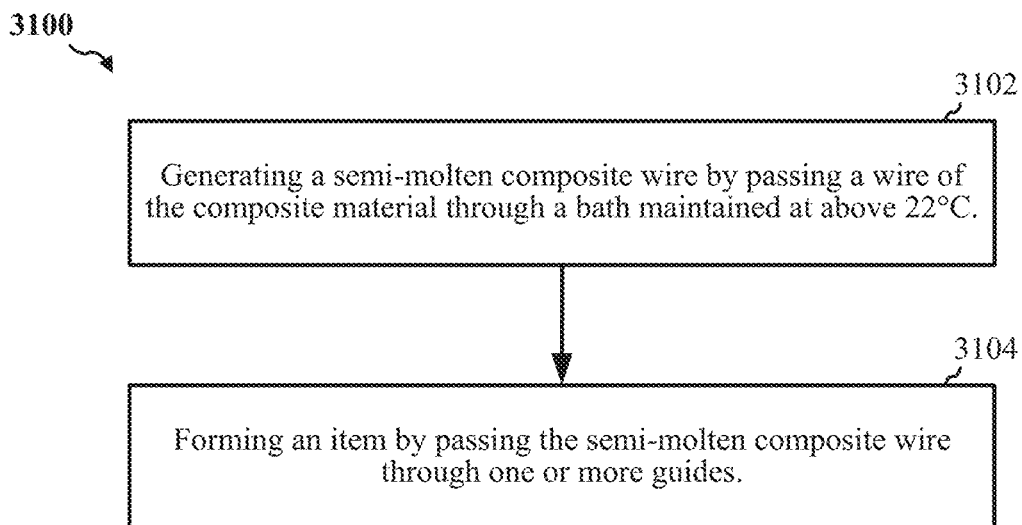
FIG. 31 shows a flowchart depicting an example operation for forming an item with composite material, according to some implementations.

FIG. 31 shows a flowchart depicting an example operation 3100 for forming an item with the composite material produced in FIG. 23, according to some implementations. In various implementations, the operation 3100 may be performed in a heated bath. In some aspects, the operation 3100 begins at block 3102 with generating a semi-molten composite wire by passing a wire of the composite material through a bath maintained at above 22° C. The operation continues at block 3104 with forming an item by passing the semi-molten composite wire through one or more guides.

Figure 32:
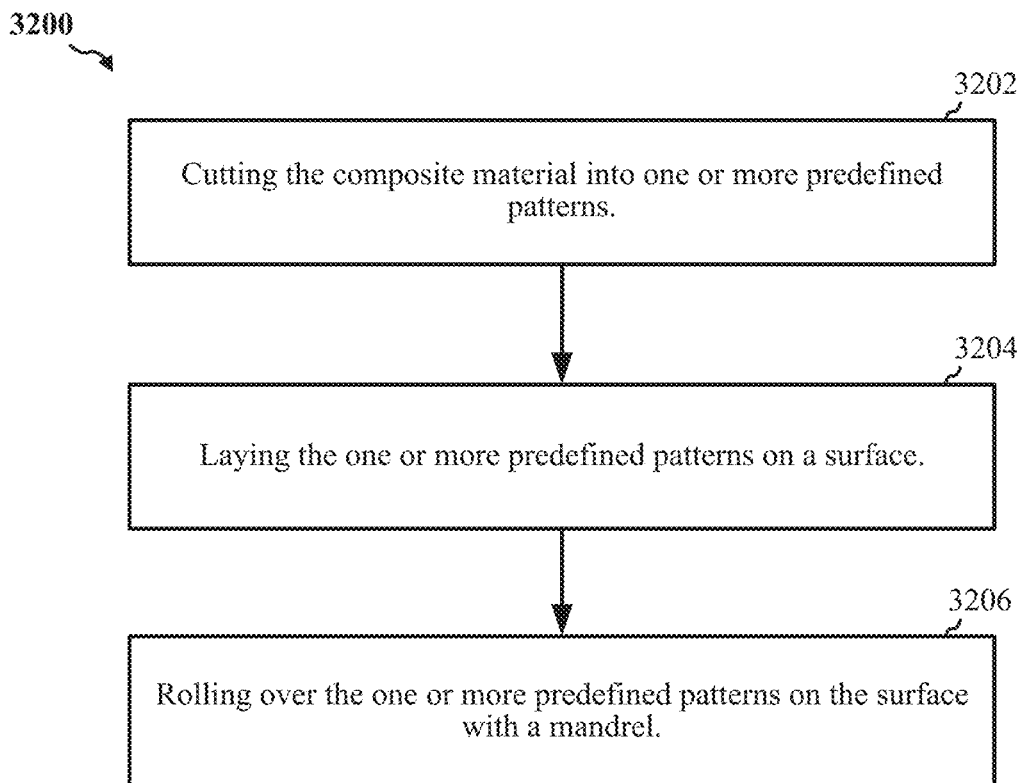
FIG. 32 shows a flowchart depicting an example operation for patterning composite material, according to some implementations.

FIG. 32 shows a flowchart depicting an example operation 3200 for patterning the composite material produced in FIG. 23, according to some implementations. In various implementations, the operation 3200 may be performed in or on a patterning tool. In some aspects, the operation 3200 begins at block 3202 with cutting the composite material into one or more predefined patterns. The operation continues at block 3204 with laying the one or more predefined patterns on a surface. The operation continues at block 3206 with rolling over the one or more predefined patterns on the surface with a mandrel.

Figure 33:
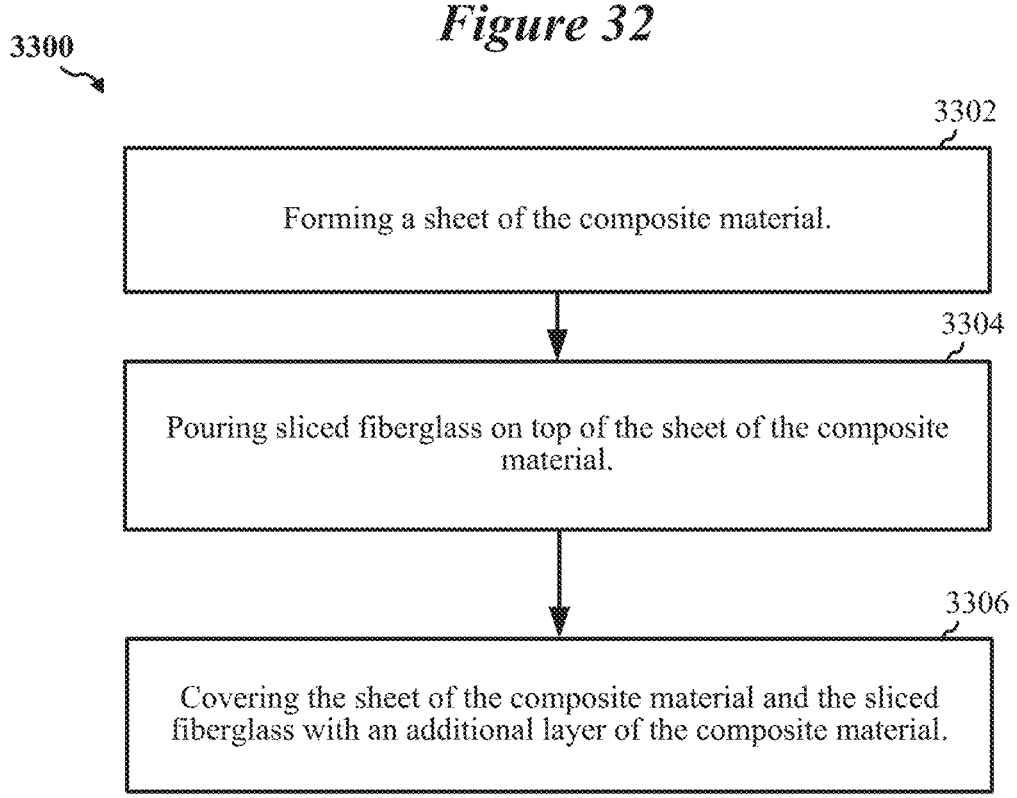
FIG. 33 shows a flowchart depicting an example operation for post-processing composite material, according to some implementations.

FIG. 33 shows a flowchart depicting an example operation 3300 for post-processing the composite material produced in FIG. 23, according to some implementations. In various implementations, the operation 3300 may be performed in or on a patterning tool. In some aspects, the operation 3300 begins at block 3302 with forming a sheet of the composite material. The operation continues at block 3304 with pouring sliced fiberglass on top of the sheet of the composite material. The operation continues at block 3306 with covering the sheet of the composite material and the sliced fiberglass with an additional layer of the composite material.

Figure 34:
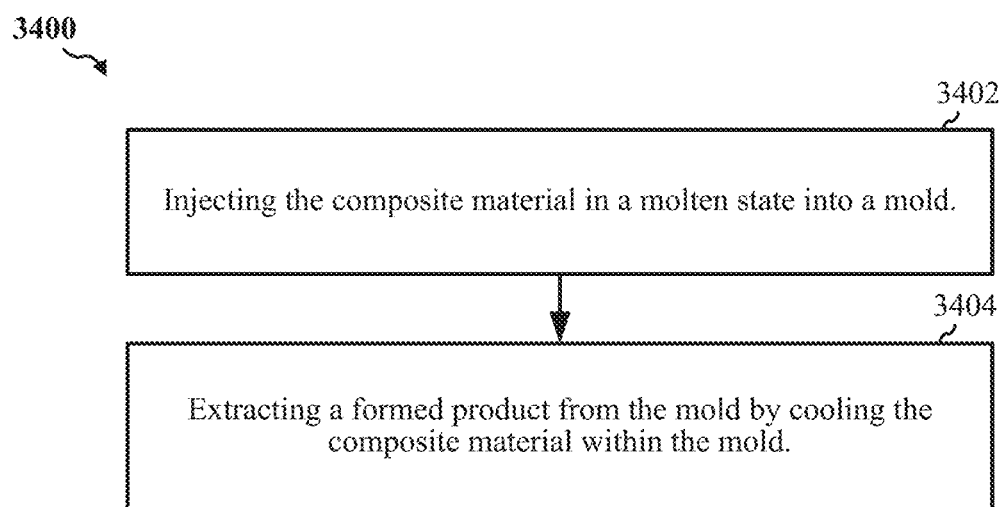
FIG. 34 shows a flowchart depicting an example operation for extracting a formed product from a mold containing composite material, according to some implementations.

FIG. 34 shows a flowchart depicting an example operation 3400 for extracting a formed product from a mold containing the composite material produced in FIG. 23, according to some implementations. In various implementations, the operation 3400 may be performed in a material extruder. In some aspects, the operation 3400 begins at block 3402 with injecting the composite material in a molten state into a mold. The operation continues at block 3404 with extracting a formed product from the mold by cooling the composite material within the mold.

Figure 35:
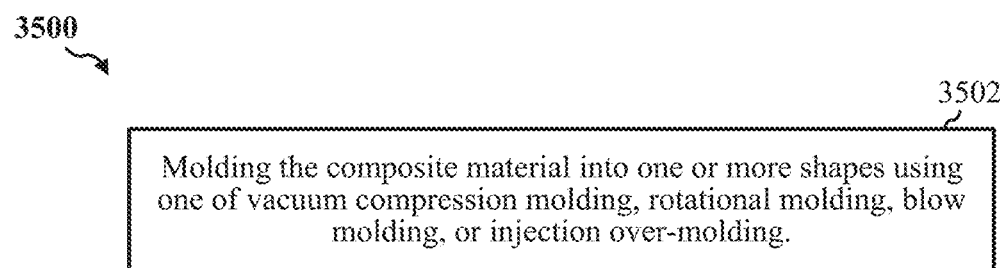
FIG. 35 shows a flowchart depicting an example operation for molding composite material into one or more shapes, according to some implementations.

FIG. 35 shows a flowchart depicting an example operation 3500 for molding the composite material produced in FIG. 23 into one or more shapes, according to some implementations. In various implementations, the operation 3500 may be performed in a mold. In some aspects, the operation 3500 begins at block 3502 with molding the composite material into one or more shapes using one of vacuum compression molding, rotational molding, blow molding, or injection over-molding.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above in combination with one another, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

What is claimed is:
1. A composite material comprising:
   a combination including a thermoplastic resin mixed with a polypropylene-graft-maleic anhydride (PPgMA); and
   a plurality of carbon particles mixed in the combination, the plurality of carbon particles includes a first region having a relatively low concentration of carbon particles per unit volume and a second region having a relatively high concentration of carbon particles per unit volume, at least some of the plurality of carbon particles have exposed carbon surfaces with carbon atoms oxidized with one or more oxygen-containing groups and bonded to molecular sites on adjacent PPgMA molecules, wherein at least some of the plurality of carbon particles are formed from one or more of a plurality of interconnected crinkled 3D graphene sheets or a plurality of non-hollow carbonaceous spherical particles (NHCS), and wherein the composite material comprises:
between 80 wt % and 90 wt % of the thermoplastic resin;
between 0.5 wt % and 15 wt % of the PPgMA; and
between 0.1 wt % to 7 wt % of the plurality of carbon particles.

2. The composite material of claim 1, wherein a density of the composite material is within +/_ 3% of a density of the thermoplastic resin.

3. The composite material of claim 1, further comprising:
a plurality of pores formed in the combination disposed between the plurality of carbon particles, wherein PPgMA infiltrates at least some of the plurality of pores, and wherein oxidation of at least some of the carbon atoms increases chemical bonding to molecular sites on adjacent PPgMA molecules.

4. The composite material of claim 3, wherein a density of the composite material is based at least in part on a collective pore volume of the plurality of pores.

5. The composite material of claim 1, wherein the composite material has a viscosity between 500 pascal-seconds (Pa-s) and 2,100 Pa-s.

6. The composite material of claim 1, wherein the composite material is post-processed by injection molding.

7. The composite material of claim 1, wherein the composite material has a flexural modulus between 107,500 pounds per square inch (PSI) and 117,500 PSI at a temperature of 23° C. under ASTM $D_{790}$ at a 1% secant modulus value.

8. The composite material of claim 1, wherein the composite material has a tunable melt flow rate between 4 grams per min (g/min) to 8 g/min at a temperature of 190° C.

9. The composite material of claim 1, wherein the composite material has a maximum tensile elongation of 500%.

10. The composite material of claim 1, wherein interaction between at least some of the plurality of carbon particles and adjacent PPgMA molecules increases mechanical reinforcement of the composite material.

11. The composite material of claim 1, wherein the thermoplastic resin includes a linear low-density polyethylene (LLDPE) resin, an ethylene-butene copolymer, and alpha-olefins.

12. The composite material of claim 1, wherein a viscosity of the composite material decreases proportionately to increases in loading levels of PPgMA within the composite material.

13. The composite material of claim 1, wherein each of the plurality of carbon particles further comprises:
a plurality of non-tri-zone particles;
a plurality of tri-zone particles, each tri-zone particle including:
a plurality of carbon fragments intertwined with each other and separated from one another by mesopores; and
a deformable perimeter that coalesces with one or more adjacent non-tri-zone particles or tri-zone particles.

14. The composite material of claim 13, wherein each of the plurality of carbon particles further comprises:
a plurality of aggregates, each aggregate includes a multitude of the tri-zone particles joined together, each aggregate has a principal dimension in a range between 10 nanometers (nm) and 10 micrometers (μm);
a plurality of mesopores interspersed throughout the plurality of aggregates, each mesopore has a principal dimension between 3.3 nanometers (nm) and 19.3 nm;
a plurality of agglomerates, each agglomerate includes a multitude of the aggregates joined to each other, each agglomerate having a principal dimension in an approximate range between 0.1 μm and 1,000 μm; and
a plurality of macropores interspersed throughout the plurality of aggregates, each macropore has a principal dimension between 0.1 μm and 1,000 μm.

15. The composite material of claim 1, wherein the PPgMA comprises:
between 0.0 wt %-1.3 wt % maleic anhydride (MA); and
between 98.7 wt. %-100 wt % polypropylene (PP).

16. The composite material of claim 1, wherein inclusion of carbon particles in the composite material increases a flexural modulus or a tensile strength of the composite material.

17. The composite material of claim 1, wherein the plurality of carbon particles has a pore volume between 0.05 cubic centimeters per gram ($cm^3/g$) and 1.5 $cm^3/g$.

18. The composite material of claim 13, wherein the tri-zone particles comprise a first zone, a second zone, and a third zone, wherein the first zone is encapsulated by the second zone, and the second zone is encapsulated by the third zone.

19. The composite material of claim 18, wherein the first zone has a density between approximately 1.5 g/cc and 5.0 g/cc.

20. The composite material of claim 18, wherein the second zone has a density between approximately 0.5 g/cc and 3.0 g/cc.

21. The composite material of claim 18, wherein the first zone comprises pores having a pore width of approximately less than 40 nm.

22. The composite material of claim 18, wherein the second zone comprises pores having a pore width of approximately less than 35 nm.

23. The composite material of claim 18, wherein the third zone comprises pores having a pore width of approximately less than 30 nm.

24. The composite material of claim 1, wherein the plurality of carbon particles comprises nitrogen-doped carbon particles.

* * * * *